US012412597B2

(12) United States Patent
Le et al.

(10) Patent No.: US 12,412,597 B2
(45) Date of Patent: Sep. 9, 2025

(54) NON-LOCALIZED SPIN VALVE MULTI-FREE-LAYER READER HYBRIDIZED WITH SPIN ORBIT TORQUE LAYERS

(71) Applicants: Western Digital Technologies, Inc., San Jose, CA (US); Tokyo Institute of Technology, Tokyo (JP)

(72) Inventors: Quang Le, San Jose, CA (US); Xiaoyong Liu, San Jose, CA (US); Brian R. York, San Jose, CA (US); Cherngye Hwang, San Jose, CA (US); Son T. Le, San Jose, CA (US); Hisashi Takano, Fujisawa (JP); Fan Tuo, Fujisawa (JP); Hassan Osman, San Jose, CA (US); Nam Hai Pham, Tokyo (JP)

(73) Assignees: Western Digital Technologies, Inc., San Jose, CA (US); Tokyo Institute of Technology, Tokyo (JP)

( * ) Notice: Subject to any disclaimer, the term of this patent is extended or adjusted under 35 U.S.C. 154(b) by 0 days.

(21) Appl. No.: 18/367,882

(22) Filed: Sep. 13, 2023

(65) Prior Publication Data
US 2024/0428820 A1    Dec. 26, 2024

Related U.S. Application Data

(60) Provisional application No. 63/523,308, filed on Jun. 26, 2023.

(51) Int. Cl.
*G11B 5/39* (2006.01)
(52) U.S. Cl.
CPC .......... *G11B 5/3954* (2013.01); *G11B 5/3909* (2013.01); *G11B 5/3912* (2013.01); *G11B 2005/3996* (2013.01)

(58) Field of Classification Search
None
See application file for complete search history.

(56) References Cited

U.S. PATENT DOCUMENTS 9,117,465 B2 *  8/2015  Kamiguchi et al. . G11B 5/3909
9,123,361 B1 *  9/2015  Kief et al. ........... G11B 5/3912
(Continued)

OTHER PUBLICATIONS

Hao, Runzi et al., "Micromagnetic simulation of Gigahertz Current Induced Magnetization Switching in a Synthetic Antiferromagnetic Free Layer", The Magnetic Recording Conference, 2023, pp. 86-87, <https://sites.google.com/umn.edu/tmrc2023/>.

*Primary Examiner* — Craig A. Renner
(74) *Attorney, Agent, or Firm* — PATTERSON + SHERIDAN, LLP

(57) ABSTRACT

The present disclosure generally relates to a magnetic recording head comprising a read head. The read head comprises a first sensor disposed at a media facing surface (MFS) comprising at least one free layer, a second sensor disposed at the MFS comprising at least one free layer, a first spin generator spaced from the first sensor and recessed from the MFS, and a second spin generator spaced from the second sensor and recessed from the MFS. The first and second spin generators each individually comprises at least one spin orbit torque (SOT) layer. The SOT layer may comprise BiSb. The first and second sensors are configured to detect a read signal using a first voltage lead and a second voltage lead. The first and second spin generators are configured to inject spin current through non-magnetic layers to the first and second sensors using a plurality of current leads.

19 Claims, 17 Drawing Sheets

(56) References Cited

U.S. PATENT DOCUMENTS

| | | | |
|---|---|---|---|
| 9,478,240 B1* | 10/2016 | Deen et al. | G11B 5/3912 |
| 9,653,103 B2* | 5/2017 | Kamiguchi et al. | G11B 5/3906 |
| 9,685,178 B1* | 6/2017 | Deen et al. | G11B 5/397 |
| 9,812,157 B1* | 11/2017 | Jung et al. | G11B 5/3912 |
| 9,837,105 B2* | 12/2017 | Hashimoto et al. | G11B 5/3906 |
| 9,934,798 B1* | 4/2018 | Deen et al. | G11B 5/3929 |
| 9,947,347 B1 | 4/2018 | Van Der Heijden et al. | |
| 11,282,538 B1 | 3/2022 | Kief | |
| 11,862,208 B1* | 1/2024 | Kief | G11B 5/3948 |
| 2010/0296202 A1* | 11/2010 | Boone, Jr. et al. | G11B 5/398 360/313 |
| 2012/0211848 A1 | 8/2012 | Sasaki et al. | |
| 2013/0258524 A1 | 10/2013 | Sasaki et al. | |
| 2015/0035524 A1 | 2/2015 | Sasaki et al. | |
| 2015/0070799 A1* | 3/2015 | Dimitrov et al. | G11B 5/3929 360/235.4 |
| 2015/0070800 A1* | 3/2015 | Dimitrov et al. | G11B 5/3909 360/235.4 |
| 2016/0099015 A1 | 4/2016 | Kamiguchi et al. | |
| 2016/0154071 A1 | 6/2016 | Sasaki | |
| 2017/0092302 A1* | 3/2017 | Deen et al. | G11B 5/3903 |
| 2018/0351082 A1 | 12/2018 | Sasaki et al. | |

* cited by examiner

NON-LOCALIZED SPIN VALVE MULTI-FREE-LAYER READER HYBRIDIZED WITH SPIN ORBIT TORQUE LAYERS

CROSS-REFERENCE TO RELATED APPLICATIONS

This application claims benefit of U.S. provisional patent application Ser. No. 63/523,308, filed Jun. 26, 2023, which is herein incorporated by reference.

BACKGROUND OF THE DISCLOSURE

Field of the Disclosure

Embodiments of the present disclosure generally relate to a magnetic recording head comprising a read head, such as a magnetic media drive or magnetic disk drive.

Description of the Related Art

At the heart of a computer is a magnetic disk drive. Information is written to and read from a disk as the disk rotates past read and write heads that are positioned very close to the magnetic surface of the disk. There have been various read head designs proposed to boost linear density based on different physical mechanisms such as a tunneling magneto-resistive (TMR) effect, a magneto-resistance (GMR) effect, an extraordinary magneto-Resistive (EMR) effect, a spin torque oscillator (STO) effect, and non-localize spin valve (NLSV).

In NLSV design, the read head may include two spatially separated tunnel junction structures, with one tunnel junction structure being recessed from a media facing surface (MFS) and the other structure being disposed at the MFS. The recessed structure often comprises a pinned layer and a ferromagnetic layer having a fixed magnetization for spin injection. However, the reader signal output in such read heads is limited by the spin injection efficiency from the pinned layer, which has a spin polarization of less than 1. As such, the relatively low spin current injection results in poor signal output, negatively impacting the read head's ability to accurately read data.

Therefore, there is a need in the art for improved read heads having high signal outputs for use in magnetic recording devices.

SUMMARY OF THE DISCLOSURE

The present disclosure generally relates to a magnetic recording head comprising a read head. The read head comprises a first sensor disposed at a media facing surface (MFS) comprising at least one free layer, a second sensor disposed at the MFS comprising at least one free layer, a first spin orbit torque (SOT) spin generator spaced from the first sensor and recessed from the MFS, and a second spin generator spaced from the second sensor and recessed from the MFS. The first and second spin generators each individually comprises at least one SOT layer. The SOT layer may comprise BiSb. The first and second sensors are configured to detect a read signal using a first voltage lead and a second voltage lead. The first and second spin generators are configured to inject spin current through non-magnetic layers to the first and second sensors using a plurality of current leads.

In one embodiment, a read head comprises a first shield; a second shield, a first non-magnetic layer disposed between the first shield and the second shield, a first sensor disposed between the first non-magnetic layer and the second shield at a media facing surface (MFS), the first sensor comprising a first free layer, a first spin generator recessed from the MFS, the first spin generator being spaced from the first sensor, wherein the first spin generator comprises a first spin orbit torque (SOT) layer, a third shield disposed over the second shield, a second non-magnetic layer disposed between the third shield and the fourth shield, a second sensor disposed between the second non-magnetic layer and the fourth shield at the MFS, the second sensor comprising a second free layer, and a second spin generator recessed from the MFS, the second spin generator being spaced from the second sensor, wherein the second spin generator comprises a second SOT layer.

In another embodiment, a magnetic recording head comprises a read head, the read head comprising: a first shield, the first shield comprising a first shield notch, a second shield disposed over the first shield, a first non-magnetic layer disposed between the first shield notch and the second shield, a first sensor disposed between the first non-magnetic layer and the second shield at a media facing surface (MFS), the first sensor comprising a first free layer, a first spin generator disposed between the first shield and the second shield recessed from the MFS, the first spin generator being spaced from the first sensor, wherein the first spin generator comprises: a first spin orbit torque (SOT) layer disposed between the first shield and the first non-magnetic layer, and a second SOT layer disposed between the first non-magnetic layer and the second shield, a third shield disposed over the second shield, the third shield comprising a second shield notch, a fourth shield disposed over the third shield, a second non-magnetic layer disposed between the second shield notch and the fourth shield, a second sensor disposed between the second non-magnetic layer and the fourth shield at the MFS, the second sensor comprising a second free layer, and a second spin generator disposed between the third shield and the fourth shield recessed from the MFS, the second spin generator being spaced from the second sensor, wherein the second spin generator comprises: a third SOT layer disposed between the third shield and the second non-magnetic layer, and a fourth SOT layer disposed between the second non-magnetic layer and the fourth shield.

In yet another embodiment, a magnetic recording head comprises a read head, the read head comprising: a first shield, a second shield, a first non-magnetic layer disposed between the first shield and the second shield, a first sensor disposed between the first shield and the second shield at a media facing surface (MFS), the first sensor comprising a first free layer and a second free layer, a first spin generator disposed between the first shield and the second shield recessed from the MFS, the first spin generator being spaced from the first sensor, wherein the first spin generator comprises: a first spin orbit torque (SOT) layer disposed between the first shield and the first non-magnetic layer, and a second SOT layer disposed between the first non-magnetic layer and the second shield, a third shield disposed over the second shield, a second non-magnetic layer disposed between the second shield and the third shield, a second sensor disposed between the second shield and the third shield at the MFS, the second sensor comprising a third free layer and a fourth free layer, and a second spin generator disposed between the second shield and the third shield recessed from the MFS, the second spin generator being spaced from the second sensor, wherein the second spin generator comprises: a third SOT layer disposed between the second shield and the second non-magnetic layer, and a fourth SOT layer disposed between the second non-magnetic layer and the third shield.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to a magnetic recording head comprising a read head. The read head comprises a first sensor disposed at a media facing surface (MFS) comprising at least one free layer, a second sensor disposed at the MFS comprising at least one free layer, a first spin generator spaced from the first sensor and recessed from the MFS, and a second spin generator spaced from the second sensor and recessed from the MFS. The first and second spin generators each individually comprises at least one spin orbit torque (SOT) layer. The SOT layer may comprise BiSb. The first and second sensors are configured to detect a read signal using a first voltage lead and a second voltage lead. The first and second spin generators are configured to inject spin current through non-magnetic layers to the first and second sensors using a plurality of current leads.

Figure 1:
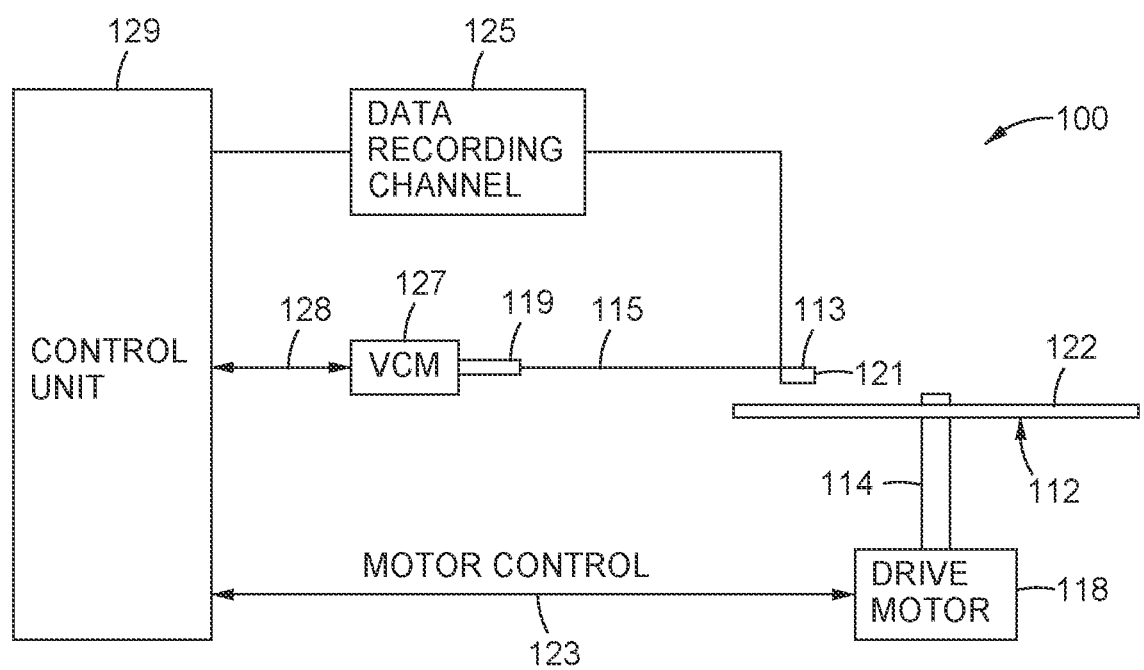
FIG. 1 illustrates a disk drive embodying this disclosure.

FIG. 1 is a schematic illustration of a magnetic recording device 100, according to one implementation. The magnetic recording device 100 includes a magnetic recording head, such as a write head. The magnetic recording device 100 is a magnetic media drive, such as a hard disk drive (HDD). Such magnetic media drives may be a single drive/device or include multiple drives/devices. For the ease of illustration, a single disk drive is shown as the magnetic recording device 100 in the implementation illustrated in FIG. 1. The magnet recording device 100 (e.g., a disk drive) includes at least one rotatable magnetic disk 112 supported on a spindle 114 and rotated by a drive motor 118. The magnetic recording on each rotatable magnetic disk 112 is in the form of any suitable patterns of data tracks, such as annular patterns of concentric data tracks on the rotatable magnetic disk 112.

At least one slider 113 is positioned near the rotatable magnetic disk 112. Each slider 113 supports a head assembly 121. The head assembly 121 includes one or more magnetic recording heads (such as read/write heads), such as a write head including a spintronic device. As the rotatable magnetic disk 112 rotates, the slider 113 moves radially in and out over the disk surface 122 so that the head assembly 121 may access different tracks of the rotatable magnetic disk 112 where desired data are written. Each slider 113 is attached to an actuator arm 119 by way of a suspension 115. The suspension 115 provides a slight spring force which biases the slider 113 toward the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by a control unit 129.

The head assembly 121, such as a write head of the head assembly 121, includes a media facing surface (MFS) such as an air bearing surface (ABS) that faces the disk surface 122. During operation of the magnetic recording device 100, the rotation of the rotatable magnetic disk 112 generates an air or gas bearing between the slider 113 and the disk surface 122 which exerts an upward force or lift on the slider 113. The air or gas bearing thus counter-balances the slight spring force of suspension 115 and supports the slider 113 off and slightly above the disk surface 122 by a small, substantially constant spacing during operation.

The various components of the magnetic recording device 100 are controlled in operation by control signals generated by control unit 129, such as access control signals and internal clock signals. The control unit 129 includes logic control circuits, storage means and a microprocessor. The control unit 129 generates control signals to control various system operations such as drive motor control signals on a line 123 and head position and seek control signals on a line 128. The control signals on line 128 provide the desired current profiles to optimally move and position slider 113 to the desired data track on rotatable magnetic disk 112. Write and read signals are communicated to and from the head assembly 121 by way of recording channel 125. In one embodiment, which can be combined with other embodiments, the magnetic recording device 100 may further include a plurality of media, or disks, a plurality of actuators, and/or a plurality number of sliders.

Figure 2:
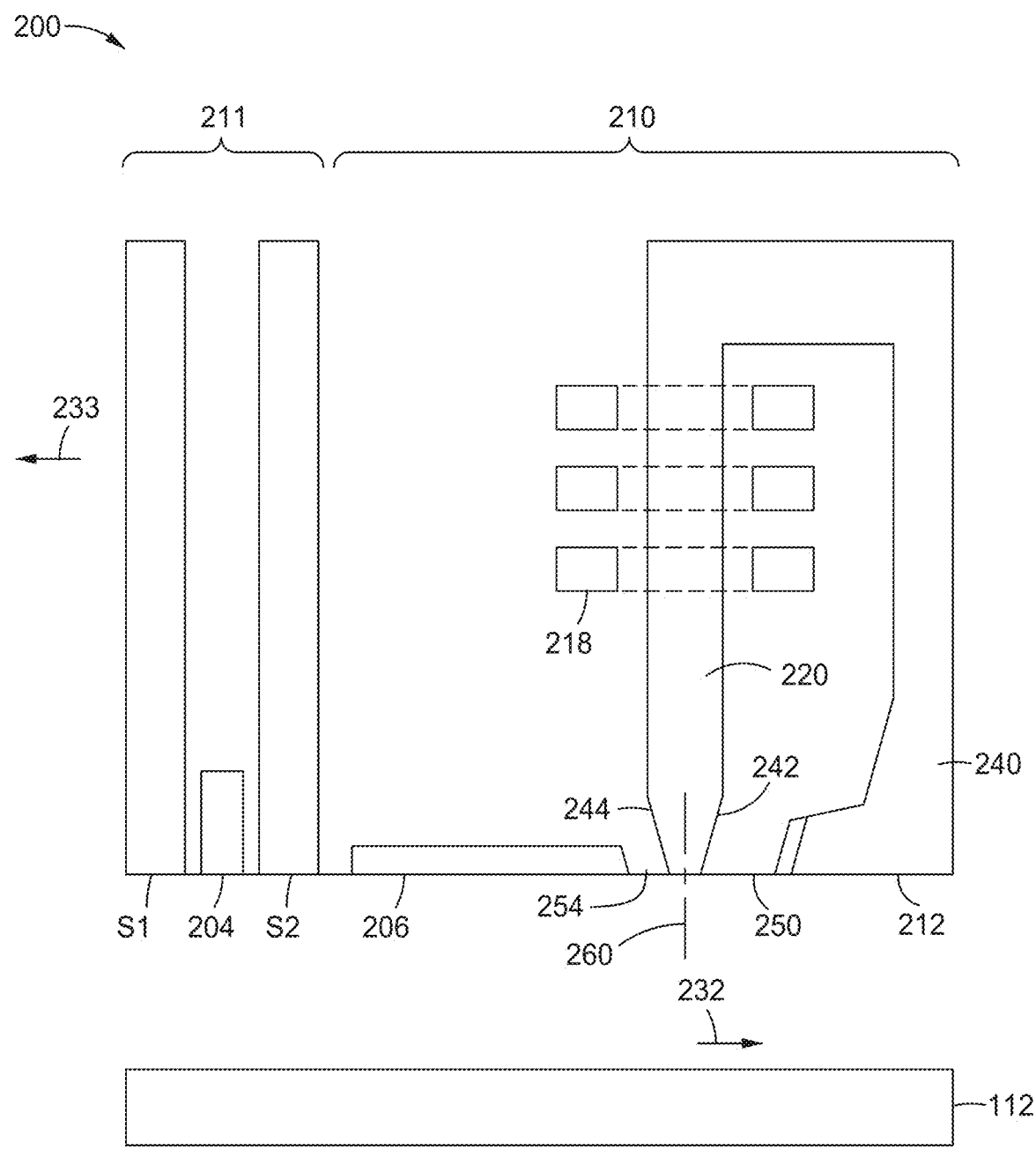
FIG. 2 is a fragmented, cross-sectional side view through the center of a read/write head facing a magnetic media, according to one embodiment.

FIG. 2 is a schematic illustration of a cross sectional side view of a head assembly 200 facing the rotatable magnetic disk 112 shown in FIG. 1 or other magnetic storage medium, according to one implementation. The head assembly 200 may correspond to the head assembly 121 described in FIG. 1. The head assembly 200 includes a MFS 212, such as an ABS, facing the rotatable magnetic disk 112. As shown in FIG. 2, the rotatable magnetic disk 112 relatively moves in the direction indicated by the arrow 232 and the head assembly 200 relatively moves in the direction indicated by the arrow 233.

In one embodiment, which can be combined with other embodiments, the head assembly 200 includes a magnetic read head 211. The magnetic read head 211 may include a sensing element 204 disposed between shields S1 and S2. The sensing element 204 and related structures will be further described with respect to various embodiments shown in the disclosure. The magnetic fields of magnetized regions in the rotatable magnetic disk 112, such as perpendicular recorded bits or longitudinal recorded bits, are detectable by the sensing element 204 as the recorded bits.

The head assembly 200 includes a write head 210. In one embodiment, which can be combined with other embodiments, the write head 210 includes a main pole 220, a leading shield 206, a trailing shield (TS) 240, and a spintronic device 250 disposed between the main pole 220 and the TS 240. Each of the main pole 220, the spintronic device 250, the leading shield 206, and the TS 240 has a front portion at the MFS.

The main pole 220 includes a magnetic material, such as CoFe, CoFeNi, NiFe, or FeNiRe, other suitable magnetic materials. In one embodiment, which can be combined with other embodiments, the main pole 220 includes small grains of magnetic materials in a random texture, such as body-centered cubic (BCC) materials formed in a random texture. In one example, a random texture of the main pole 220 is formed by electrodeposition. The write head 210 includes a coil 218 around the main pole 220 that excites the main pole 220 to produce a writing magnetic field for affecting a magnetic recording medium of the rotatable magnetic disk 112. The coil 218 may be a helical structure or one or more sets of pancake structures.

In one embodiment, which can be combined with other embodiments, the main pole 220 includes a trailing taper 242 and a leading taper 244. The trailing taper 242 extends from a location recessed from the MFS 212 to the MFS 212. The leading taper 244 extends from a location recessed from the MFS 212 to the MFS 212. The trailing taper 242 and the leading taper 244 may have the same degree or different degree of taper with respect to a longitudinal axis 260 of the main pole 220. In one embodiment, which can be combined with other embodiments, the main pole 220 does not include the trailing taper 242 and the leading taper 244. In such an embodiment, the main pole 220 includes a trailing side and a leading side in which the trailing side and the leading side are substantially parallel.

The TS 240 includes a magnetic material, such as FeNi, or other suitable magnetic materials, serving as a second electrode and return pole for the main pole 220. The leading shield 206 may provide electromagnetic shielding and is separated from the main pole 220 by a leading gap 254.

Figure 3:
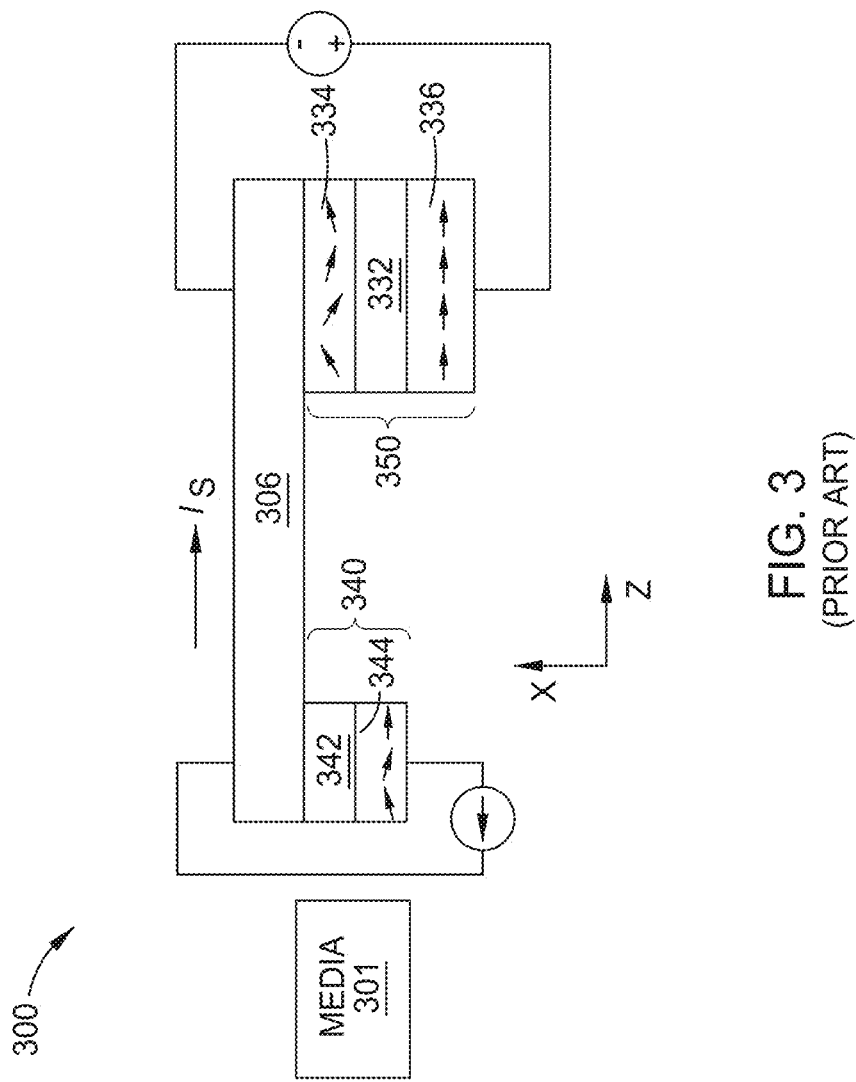
FIG. 3 illustrates a conventional read head based on NLSV.

FIG. 3 illustrates a read head 300 based on NLSV. The read head 300 comprises a read sensor 340 disposed at the MFS adjacent to a media 301 and a spin generator 350 recessed from the MFS. The read sensor 340 and the spin generator 350 are each individually disposed between a first shield (not shown) and the second shield (not shown), and are separated, with the read sensor 340 being exposed to MFS and the spin generator 350 been recessed from MFS. The read sensor 340 and the spin generator 350 are also spaced from each other by some finite distance. A non-magnetic layer 306 is disposed adjacent to each of the first sensor 340 and the spin generator 350. The non-magnetic layer 306 may comprise Cu or Al, for example.

The read sensor 340 comprises a first free layer 344 and a first tunnel barrier layer 342 disposed between the first free layer 344 and the non-magnetic layer 306. Voltage leads are connected to the non-magnetic layer 306 and the first free layer 344 for read signal detection through the read sensor 340.

The spin generator 350 comprises a reference layer 336, a second tunnel barrier layer 332 disposed on the reference layer 336, and a second free layer 334 disposed between the non-magnetic layer 306 and the second tunnel barrier layer 332. The spin generator 350 is spaced a distance of about up to a spin diffusion length of the non-magnetic layer 306 from the read sensor 340. For instance, if the non-magnetic layer 306 is made of Cu, the distance can be up to about 100 nm to about 300 nm. Current leads are connected to the non-magnetic layer 306 and the reference layer 336 for spin injection. During operation, when an electrical current is applied and applied through the spin generator 350, a spin polarized current travels from the spin generator 350 down through the non-magnetic layer 306 to the read sensor 340. The spin injection from the spin generator 350 allows the spin current to flow to the read sensor 340, enabling the signal detection from the first free layer 344's magnetization changes when reading data from recording disk.

However, since spin generator 350 comprises a reference layer 336 having a fixed magnetization direction, the spin injection efficiency is limited by the spin polarization of the reference layer 336 which cannot be bigger than 1. As such, the reader signal output of the read head 300 is limited.

Figure 4A:
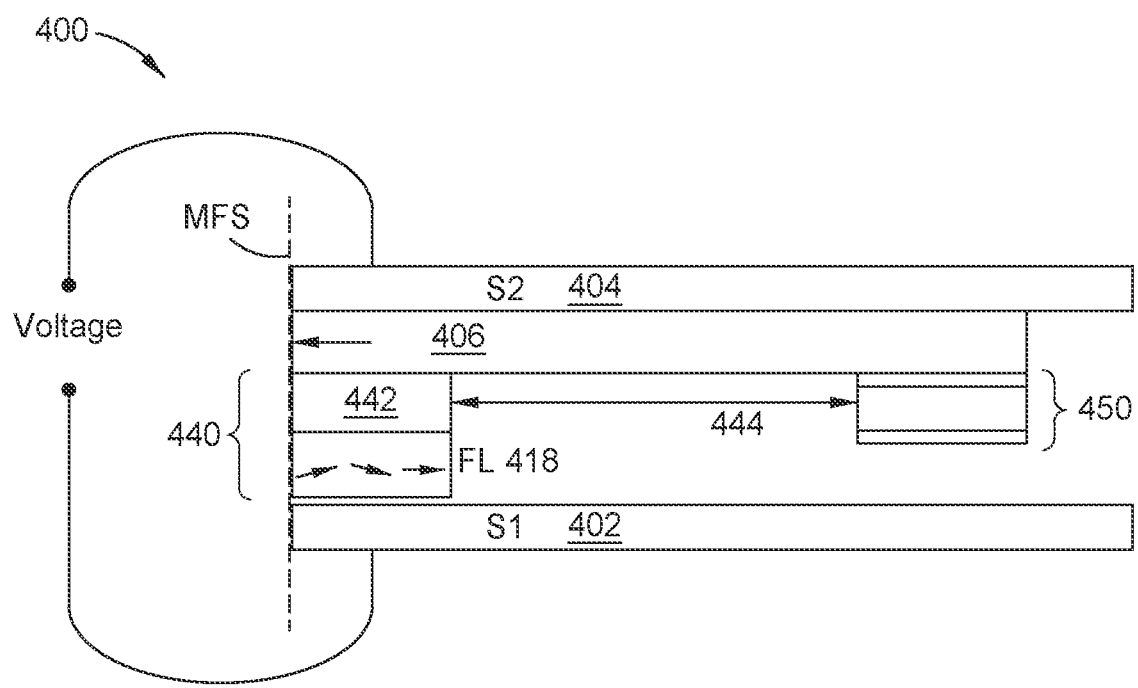
FIGS. 4A-4B illustrate a read head, according to one embodiment.
Figure 4B:
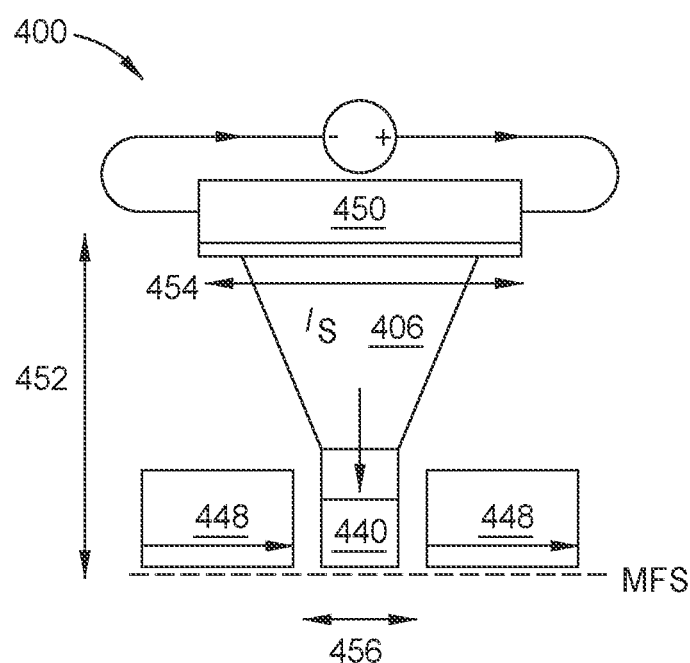

FIGS. 4A-4B illustrate a read head 400, according to one embodiment. FIG. 4A illustrates a cross-sectional view of the read head 400 and FIG. 4B illustrates a side view of the read head 400. The read head 400 may be within the read head 211 of FIG. 2. The read head 400 may be a part of the magnetic recording device 100 of FIG. 1. In the side view of FIG. 4B, the first shield (S1) 402 and the second shield (S2) 404 are not shown for clarity purposes. The first shield 402 may be the S1 of FIG. 2, and the second shield 404 may be the S2 of FIG. 2. The read head 400 may be a two dimensional magnetic recording (TDMR) read head.

The read head 400 comprises a read sensor 440 disposed at the MFS and a SOT spin generator 450 recessed from the MFS. The read sensor 440 is disposed between the first shield 402 and the second shield 404. A non-magnetic layer 406 is disposed between the second shield 404 and each of the first and spin generators 440, 450. The non-magnetic layer 406 extends from the MFS to a back edge of the spin generator 450. The non-magnetic layer 406 has a height 452 less than, or closer to, the spin diffusion length of the non-magnetic layer 406, generally of about 100 nm to about 300 nm, depending on material used in the non-magnetic layer 406. The non-magnetic layer 406 may comprise a material having a long spin diffusion length, such as Cu, Al, or some other 2D materials, such as graphene, and other van der Waals material, like $MoS_2$, $HfS_2$, etc. The read sensor 440 is spaced a distance 444 equal to about the height of the non-magnetic layer 406 from the spin generator 450.

In some embodiments, the non-magnetic layer 406 may have a greater height than the first and second shields 402, 404, or a smaller height than the first and second shields 402, 404 (the configuration shown in FIG. 4A). The non-magnetic layer 406 has a height 452 of less than, or closer to, the spin diffusion length of the non-magnetic layer 406, generally of about 100 nm to about 300 nm, depending on material used in the non-magnetic layer 406. In addition, the first and second shields 402 and 404 may have different dimensions (different heights from MFS).

Depending on (1) the respective heights of the first shield 402 and the second shield 404, and (2) the spin diffusion characteristics of the non-magnetic layer 406 (which influences the recess spacing of the spin generator 450), the spin generator 450 may or may not be between the two shields. While FIGS. 4A-9B show one or more spin generator between the shields and the shields are relatively similar or the same in dimensions, the disclosure is not so limited and there are other embodiments where the spin generator 450 may not be between the two shields. In those embodiments, a portion of the non-magnetic layer 406 that overlaps with the sensor could be between the two shields, but another portion of the non-magnetic layer 406 that overlaps with the spin generator 450 may not be.

The read sensor 440 comprises at least one free layer 418 disposed adjacent to the first shield 402 and at least one tunnel barrier layer 442 disposed between the free layer 418 and the non-magnetic layer 406. The free layer 418 may comprise a magnetic material such as one or more layers of Co—Fe, Co—Fe—B, Pt, or a Heusler alloy. The tunnel barrier layer 442 may comprise MgO or AlOx, for example, where x is a numeral greater than 1. Voltage leads are connected to the first and second shields 402, 404 for read signal detection through the read sensor 440. While only one free layer 418 and one tunnel barrier layer 442 are shown, the read sensor 440 may be a dual free layer (DFL) sensor, as discussed further below.

The spin generator 450 is a multilayer structure. The SOT spin generator 450, or the recessed read sensor 450, may be any of the read sensors 500-800 discussed below in FIGS. 5A-8B. Electrical current leads are fed into the spin generator 450 for spin injection. During operation, when current is applied to the read head 400 inside of the SOT spin generator 450 plane, due to a spin Hall effect, there will be a spin current travels from the SOT spin generator 450 down through the non-magnetic layer 406 to the read sensor 440. This spin current flowing through the read sensor 440 enables an electrical signal generation across the sensor 440 when the free layer 418 rotates its magnetization directions when reading data.

As shown in FIG. 4B, the non-magnetic layer 406 may have a triangular or trapezoidal shape such that the non-magnetic layer 406 is wider further away from the MFS and narrows as the non-magnetic layer 406 gets closer to the MFS. In such embodiments, the wider portion of the non-magnetic layer 406 has a width 454 of less than or equal to about 100 nm, and the narrower portion of the non-magnetic layer 406 has a width 456 of about 10 nm to about 20 nm, which is closer to a track width (TW) of the read sensor 440.

The free layer 418 of the sensor 440 may have a same width 456 as the narrower portion of the non-magnetic layer 406 when the non-magnetic layer 406 varies in width. The spin generator 450 is disposed on a wider part of the non-magnetic layer 406. Side shields 448 are disposed on either side of the non-magnetic layer 406 and read sensor 440 at the MFS for the proper biasing of the free layer 418.

Figure 4C:
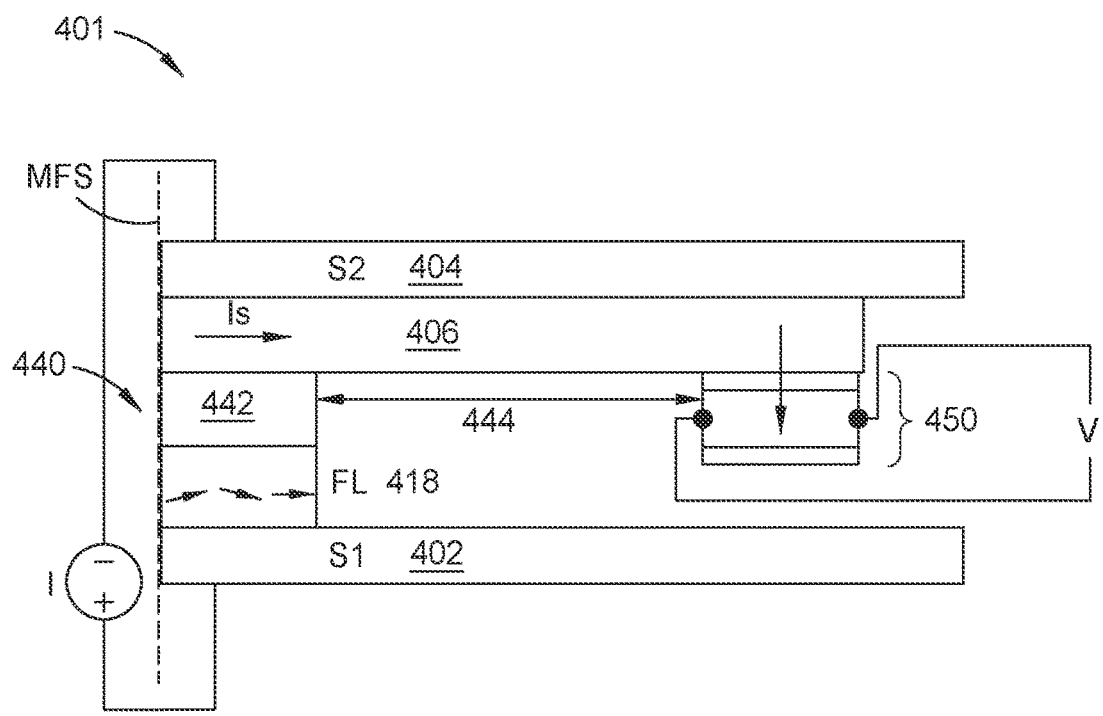
FIGS. 4C-4D illustrate a read head, according to another embodiment.
Figure 4D:
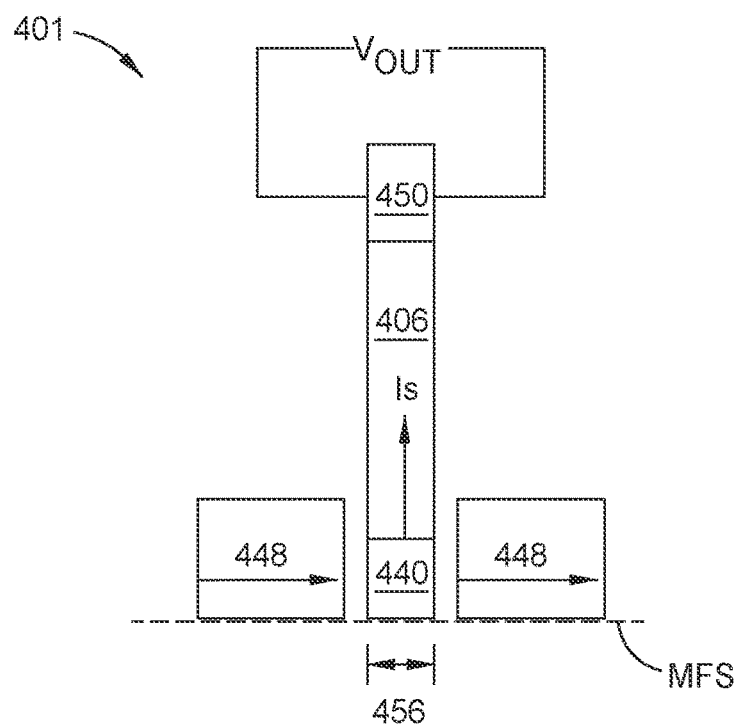

FIGS. 4C-4D illustrate a read head 401, according to one embodiment. FIG. 4C illustrates a cross-sectional view of the read head 401 and FIG. 4D illustrates a top view of the read head 401. The read head 401 may be within the read head 211 of FIG. 2. The read head 401 may be a part of the magnetic recording device 100 of FIG. 1. In the top view of FIG. 4D, the first shield (S1) 402 and the second shield (S2) 404 are not shown for clarity purposes.

The read head 401 of FIGS. 4C-4D is similar to the read head 400 of FIGS. 4A-4B; however, the spin generator 450 serves the function of spin detection, and will be referred to herein as a spin detector 450 or spin detector layer 450, and the current and voltage leads are reversed, resulting in the direction the generated spin current flows through the non-magnetic layer 406 being reversed. In the read head 401, input current leads (I) are connected to the first shield 402 and to the second shield 404, and voltage leads (V) are connected to the spin detector 450. During operation, when a current is applied to read head 401, a spin current ($I_s$) from the FL 418 is generated and flows across the read sensor 440 into the non-magnetic layer 406. The spin current travels from the read sensor 440 up through the non-magnetic layer 406 to the spin detector 450. The vertical spin current flowing through the spin detector 450 enables an electrical signal/voltage generation across the side (cross-track direction) of the spin detector 450 due to the inverse spin Hall effect. When the free layer 418 rotates its magnetization directions when reading data, spin polarization of the spin current ($I_s$) will change, resulting in an output voltage ($V_{out}$) across the spin detector 450 reflecting the magnetic bit information on the recording track.

Furthermore, when the current leads (I) are connected to the first shield 402 and to the second shield 404, and voltage leads (V) are connected to the spin detector 450, the non-magnetic layer 406 has a rectangular shape. In such embodiments, the non-magnetic layer 406 has a consistent narrow width 456 of about 10 nm to about 20 nm, which is closer to a track width (TW) of the read sensor 440.

FIGS. 5A-8B illustrate various embodiments of read heads 500, 501, 600, 601, 700, 800, respectively, according to various embodiments. Each read head 500, 600, 700, 800 may individually be the read head 400 of FIGS. 4A-4B. Each read head 501, 601 may individually be the read head 401 of FIGS. 4C-4D. Each read head 500, 501, 600, 601, 700, 800 may individually be within the read head 211 of FIG. 2. Each read head 500, 501, 600, 601, 700, 800 may individually be a part of the magnetic recording device 100 of FIG. 1. Aspects of FIGS. 5A-8B may not be shown to scale, such as the height of the first and second shields 402, 404 in the x-direction. Furthermore, aspects of each read head 500, 501, 600, 601, 700, 800 may be used in combination with one another and/or with the read head 400 of FIGS. 4A-4B. As such, various layers and/or aspects of the read heads 400, 401, 500, 501, 600, 601, 700, 800 may have consistent reference numerals.

Figure 5A:
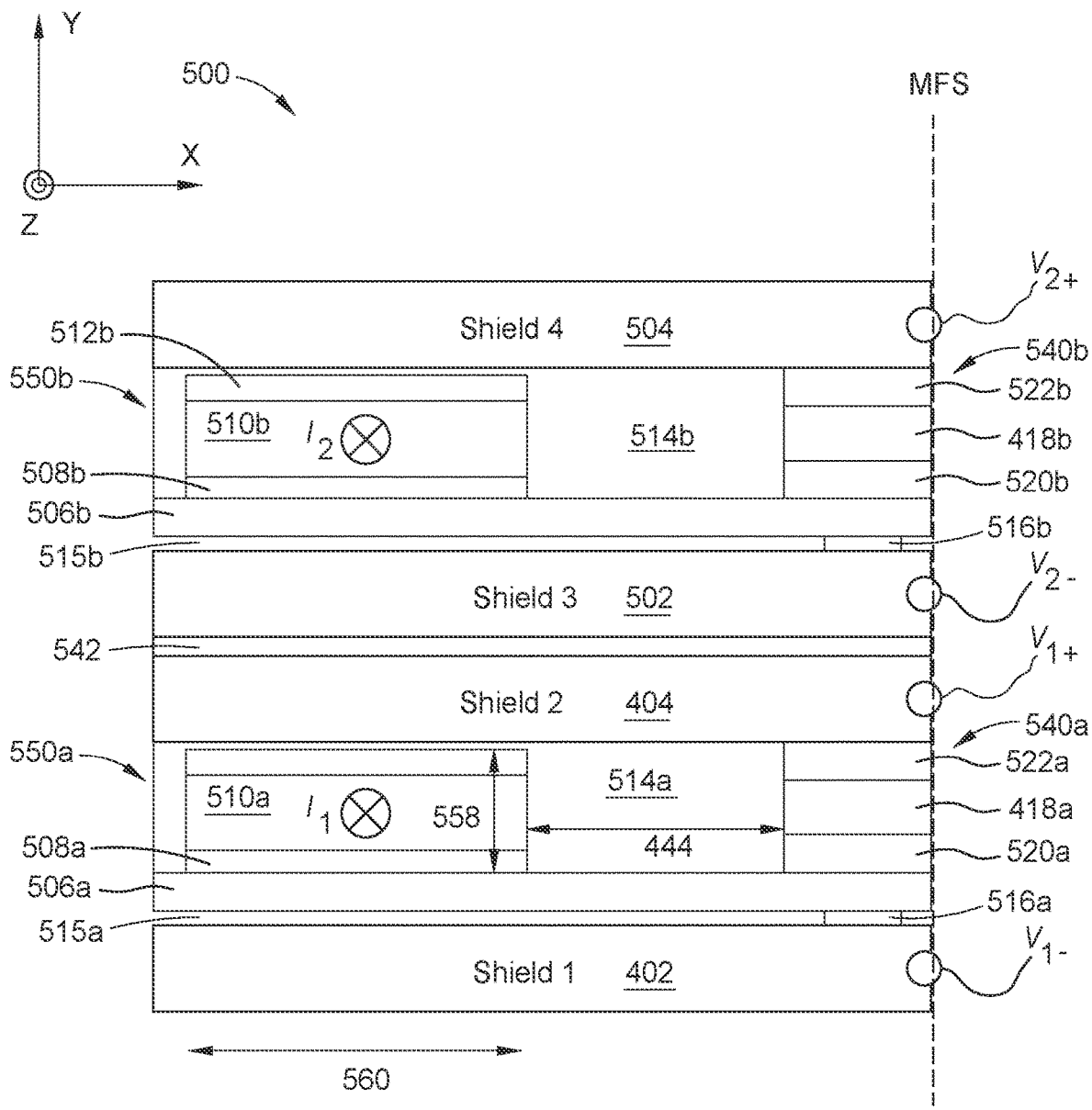
FIGS. 5A-5B illustrate a read head of a magnetic recording head, according to one embodiment.
Figure 5B:
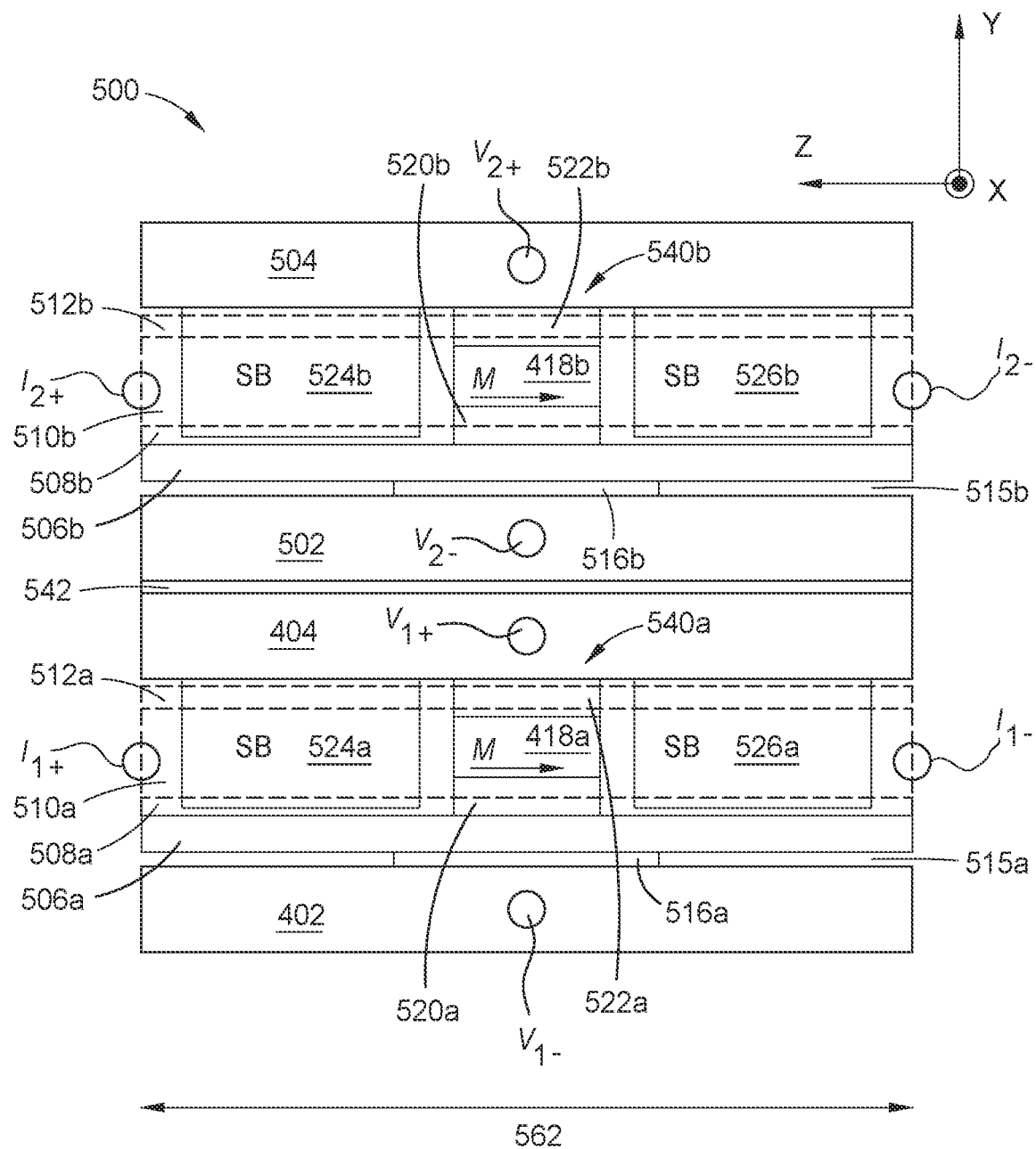

FIGS. 5A-5B illustrate a TDMR read head 500 of a magnetic recording head, according to one embodiment. FIG. 5A illustrates a cross-sectional view of the TDMR read head 500 and FIG. 5B illustrates a MFS view of the TDMR read head 500.

The TDMR read head 500 comprises a first lower shield 402, a first non-magnetic layer 506a disposed over the first lower shield 402, a first, or lower, free layer (FL) read sensor 540a disposed at the MFS on the first non-magnetic layer 506a, a first, or lower, a spin orbit torque (SOT) spin generator 550a recessed from the MFS on the first non-magnetic layer 506a, a first upper shield 404 disposed over the first FL read sensor 540a and the first spin generator 550a, and an insulating layer 514a disposed between the first FL sensor 540a and the first SOT generator 550a. A first notch 516a is disposed between the first lower shield 402 and the first non-magnetic layer 506a and is recessed from the MFS.

The TDMR read head 500 further comprises an insulating layer 542 disposed on the first upper shield 404, a second lower shield 502 disposed on the insulating layer 542, a second non-magnetic layer 506b disposed over the second lower shield 502, a second, or upper, FL read sensor 540b disposed at the MFS on the second non-magnetic layer 506b, a second, or upper, SOT spin generator 550b recessed from the MFS on the second non-magnetic layer 506b, a second upper shield 504 disposed over the second FL read sensor 540b and the second SOT spin generator 550b, and an insulating layer 514b disposed between the second FL sensor 540b and the second SOT generator 550b. A second notch 516b is disposed between the second lower shield 502 and the second non-magnetic layer 506b and recessed from the MFS.

Each SOT layer 510a, 510b is spaced the distance 444 from the first free layer 418a and the second free layer 418b, respectively. In some embodiments, the first upper shield 404 and the second lower shield 502 are a single middle shield, and the insulating layer 542 is not included, like shown in the TDMR read head 800 of FIGS. 8A-8B.

The first notch 516a and the second notch 516b are each individually recessed a distance of about 0 nm to about 20 nm from the MFS. The first notch 516a and the second notch 516b each individually has a thickness in the y-direction of about 5 nm to about 20 nm and a height in the x-direction of about 5 nm to about 20 nm. The first lower shield 402, first upper shield 404, second lower shield 502, second upper shield 504, the first notch 516a, and the second notch 516b may each individually comprise a magnetic material similar to the soft bias material, such as NiFe, NiFe/CoFe laminates, NiFe/NiFeCr laminates, or NiFe/W laminates, for example ("/" as used here denotes separate layers in a multi-layer stack). A first dielectric layer 515a is disposed in front of the first notch 516a at the MFS and behind the first notch 516a recessed from the MFS, and a second dielectric layer 515b is disposed in front of the second notch 516b at the MFS and behind the second notch 516b recessed from the MFS. The first dielectric layer 515a spaces the first lower shield 402 from the first non-magnetic layer 506a, and the second dielectric layer 515b spaces the second lower shield 502 from the second non-magnetic layer 506b. The first dielectric layer 515a and the second dielectric layer 515b may each individually comprise SiN, SiO$_2$, MgO, AlO, AlN, or combinations thereof.

The first FL sensor 540a comprises a first tunnel barrier layer 520a disposed on the first non-magnetic layer 506a, a first free layer 418a disposed on the first tunnel barrier layer 520a, and a first cap layer 522a disposed on the first free layer 418a and in contact with the first upper shield 404. A magnetization (M) direction of the first free layer 418a is in the −z-direction at quiescent state during operation. Similarly, the second FL sensor 540b comprises a second tunnel barrier layer 520b disposed on the second non-magnetic layer 506b, a second free layer 418b disposed on the second tunnel barrier layer 520b, and a second cap layer 522b disposed on the second free layer 418b and in contact with the second upper shield 504. A magnetization (M) direction of the second free layer 418b in the −z-direction at quiescent state during operation, or parallel to the magnetization direction of the first free layer 418a. The first and second tunnel barrier layers 520a, 520b (see list of materials in FIG. 4A tunnel barrier layer 442), and the first and second cap layers 522a, 522b, may each individually be multilayer structures or single layer/material structures.

The first SOT spin generator 550a comprises a first seed layer 508a disposed on the first non-magnetic layer 506a, a first SOT layer 510a (which may be referred to herein as a first BiSb layer 510a) disposed on the first seed layer 508a, and a first cap layer 512a disposed on the first SOT layer 510a. The second SOT spin generator 550b comprises a second seed layer 508b disposed on the second non-magnetic layer 506b, a second SOT layer 510b (which may be referred to herein as a second BiSb layer 510b) disposed on the second seed layer 508b, and a second cap layer 512b disposed on the second SOT layer 510b. As shown in FIG. 5B, the first SOT layer 510a has a greater overall size in the z-direction than the first free layer 418a, and the second SOT layer 510b has a greater overall size in the z-direction than the second free layer 418b. The first SOT layer 510a and the second SOT layer 510b may have the same dimensions, and the first free layer 418a and the second free layer 418b may have the same dimensions.

The first and second cap layers 512a, 512b may each individually comprise a non-magnetic, high resistivity material, such as Ru, NiFeGe, or some oxide materials, for example. The first and second cap layers 512a, 512b may be multilayer structures or comprise a single layer/material. In some embodiments, the insulating layers 514a, 514b each extend over the first and second cap layers 512a, 512b, respectively, and behind the first and second SOT sensors 550a, 550b, like shown in FIG. 5A. The insulating layers 514a, 514b, 542 may each individually comprise SiN, SiO$_2$, MgO, AlO, AlN, MgTiOx, or combinations thereof.

A first negative voltage lead ($V_{1-}$) is connected to the first lower shield 402 and a first positive voltage lead ($V_{1+}$) is connected to the first upper shield 404 for read signal detection through the first FL sensor 540a. A second negative voltage lead ($V_{2-}$) is connected to the second lower shield 502 and a second positive voltage lead ($V_{2+}$) is connected to the second upper shield 504 for read detection across the second FL sensor 540b.

As shown in the MFS view of FIG. 5B, the TDMR read head 500 further comprises a first soft bias (SB) side shield 524a and a second SB side shield 526a each adjacent to the first FL sensor 540a at the MFS. A third SB side shield 524b and a fourth SB side shield 526b are disposed adjacent to the second FL sensor 540b at the MFS. The first, second, third, and fourth SB side shields 524a, 526a, 524b, 526b may each individually comprise NiFe, CoFe, and other magnetic materials for proper free layer biasing across track (i.e., the z-direction in FIG. 5B). A first positive current lead ($I_{1+}$) and a first negative current lead ($I_{1-}$) are each connected to the first SOT layer 510a. A first electrical current ($I_1$) travels through the first SOT layer 510a into the page of FIG. 5A, or the −z-direction. A second positive current lead ($I_{2+}$) and a second negative current lead ($I_{2-}$) are each conned to the second SOT layer 510b. A second electrical current ($I_2$) travels through the second SOT layer 510b into the page of FIG. 5A, or the −z-direction.

During operation, when electrical currents are applied to the TDMR read head 500 as indicated by $I_1$ and $I_2$, a first spin current travels from the first SOT spin generator 550a down through the first non-magnetic layer 506a to the first FL sensor 540a, and a second spin current travels from the second SOT spin generator 550b down through the second non-magnetic layer 506b to the second FL sensor 540b. The spin transport allows the spin current to flow to the first and second FL sensors 540a, 540b, enabling an electrical signal generation across the first sensor 540a and the second sensor 540b when the first and second free layers 418a, 418b rotate magnetization directions when reading data.

The first and second SOT layers 510a, 510b each individually comprises heavy metal with strong spin orbital coupling, such as Ta, Pt, W, Hf, etc. The first and second SOT layers 510a, 510b can individually comprise a topological insulator material, such as BiSe, WTe, YBIOPt, or BiSb. The first and second SOT layers 510a, 510b may each individually comprise BiSb in a (012) orientation. The first and second SOT layers 510a, 510b may each individually comprise undoped BiSb or doped BiSbX, where the dopant is less than about 10 at. %, and where X is extracted from elements which don't readily interact with Bi, such as B, N, Al, Si, Ti, V, Cr, Fe, Ni, Cu, Ge, Y, Zr, Ru, Mo, Ag, Hf, Ta, W, or Ir, or in alloy combinations with one or more of aforementioned elements, like CuAg, CuNi, RuGe, etc. More generally, some of the listed dopants may be used with other topological insulator materials other than BiSb. Each SOT layer 510a, 510b has a thickness 558 in the y-direction (e.g., a down-track direction) of about 5 nm to about 20, a height 560 in the x-direction (e.g., a stripe height) of about 100 nm to about 1 μm, and a width 562 (e.g., a cross-track direction) in the z-direction of less than about 100 nm.

Numerous materials may be utilized as the first and second seed layers 508a, 508b to provide a textured SOT layer 510 (012) growth using either textures (100) or as amorphous seed layers. The first and second seed layers 508a, 508b may each be multilayer structures or comprise a single layer/material. One group of materials, Group A, includes body centered cubic (BCC) such as V, $V_3Al$, $Mn_3Al$, Nb, Mo, W, Ta, $WTi_{50}$, NiAl, RhAl, or in alloy combinations of these materials with similar lattice parameters, or a BCC material used in combination with (100) textured layers such as Cr (heated at about 250° C. or larger), RuAl, IrAl, CoAl, B2 phases, NiAl—B2 phase, CrMo(Mo of about 20-50 at. %)-A2, or B2 phase, A2 CrX(X is about at. 10%, heated at about 250° C. or larger, and is selected from Ru, Ti, W, and Mo).

The Group A materials provide texturing for subsequent layers and may be referred to as a MgO (100) texturing layer stack. Generally speaking, depositing a high boron (B) affinity elements or alloys such as alloys of tantalum (Ta), tungsten (W), or titanium (Ti) and then depositing a magnetic layer containing boron (B), an amorphous magnetic layer material such as cobalt iron boron (CoFeB) or cobalt boron (CoB) is formed, but the boron would be pulled out leaving a magnetic cobalt iron or cobalt layer behind. On top of that layer, MgO could be formed with a (100) texture. Other manners to make MgO (100) can include depositing heated chromium or ruthenium aluminum grow in a textured fashion. MgO (100) texturing layer stacks can also be made by depositing thin MgO on a magnetic bilayer of Co, or CoFe on a magnetic boron alloy of CoFeB or CoB deposited on a thin high B gettering alloy seed layers of Hf, Ta, W, Ti, or alloys containing these elements.

Another group of materials, Group B, includes face centered cubic (FCC) oxide materials including FeO, CoO, NiO, ZrO, MgO, TiO, MgTiO, and MnO. Another group of materials, Group C, includes FCC nitrides and carbides including ScN, TiN, NbN, ZrN, HIN, TaN, VN, CrN, ScC, TiC, NbC, ZrC, HfC, TaC, WC, VC, and $W_{0.8}Zr_{0.2}C$. Group C materials can be deposited as amorphous to nanocrystalline thin films depending upon deposition conditions. Resistivities of Group C materials are >100-200 micro ohm-cm.

Another groups of materials, Group D, includes nonmagnetic Heusler materials including FezVAl, $Cr_2CoAl$, CoTiSb, $Mn_2VSi$, $V_2Al$, $[Mn_{0.5}Co_{0.5}]_2VAl$, $[Mn_{0.75}Co_{0.25}]_2VSi$, CoMnNbAl, CoZrFeAl, and $Ti_2MnAl$. Another group of materials, Group E, are crystalline high polarization layers using magnetic alloys or Heusler alloys that have large spin polarizations and do not readily mix with a spin Hall layer including: $Co_2MnSb$, CoFeX, NiFeX, (where X is one or more of Si, Al, Mn, and Ge) CoFe, NiFe, $Co_2MnGe$, CoMnSb, NiMnSb, $Co_2FeGe$, $Co_2MnSn$, and $Co_2MnFeGe$. Another group of materials, Group F, includes amorphous nonmagnetic high resistive electrical shunt block layers that do not promote strong (012) BiSbX texture or growth. They include $SiO_2$, $Al_2O_3$, SiN, AlN, SiC, SiCrOx, Nix, Fex, and Cox, where X can be one or more of these elements including Fe, Co, Ni, Ta, Hf, W, Ir, Pt, Ti, Zr, N, Ru, Ge and/or B.

Another group of materials, Group G, includes any metal amorphous or ceramic amorphous material with the nearest neighbor x-ray diffraction peak in the 2.19 Å to 2.02 Å d-spacing range. Such materials include nonmagnetic and magnetic materials from Group A, D, or E which are laminated or alloyed with one or more elements of: Cu, Ag, Ge, Al, Mg, Si, Mn, Ni, Co, Mo, Zr, Y, Bi, Hf, Ta, W, Ir, Pt, Ti, or B. They form effectively nonmagnetic amorphous layers which produce amorphous materials or start with amorphous materials like a-Ge, and a-NiPX alloys (where X is one of Ru, Rh, Y, Zr, Mo, Hf, Ta, W, Re, Pt, or Ir), etc. Group G also may include amorphous/nanocrystalline alloys with a-Ge, a-NiP and one or more elements of: Cu, Ag, Ge, Al, Mg, Si, Mn, Ni, Co, Mo, Zr, Y, Bi, Hf, Ta, W, Ir, Pt, Ti, or B to promote a strong (012) BiSb texture.

Yet another group of materials, Group H, are high perpendicular magnetic anisotropy (PMA) materials that can be amorphous or crystalline materials. Amorphous rare-earth transition metals (RE-TM) that have high PMA like TbFeCo, TbFeB, Nd, Pr, Sm(Fe, Co) B or heavy metals like CoZrTaB can be used. This multilayer polycrystalline stacks of Co/Pt, Co/Pd, CoFe/Pt, Co/Tb, or CoFe/Tb ("/" denoting layer separation), or single layer PMA materials like CoPt, CoPtCr, CoFePt, and FePt with high Ku can be used with an amorphous high polarizing layer next to the spin Hall layer for (012) texture growth.

Figure 5C:
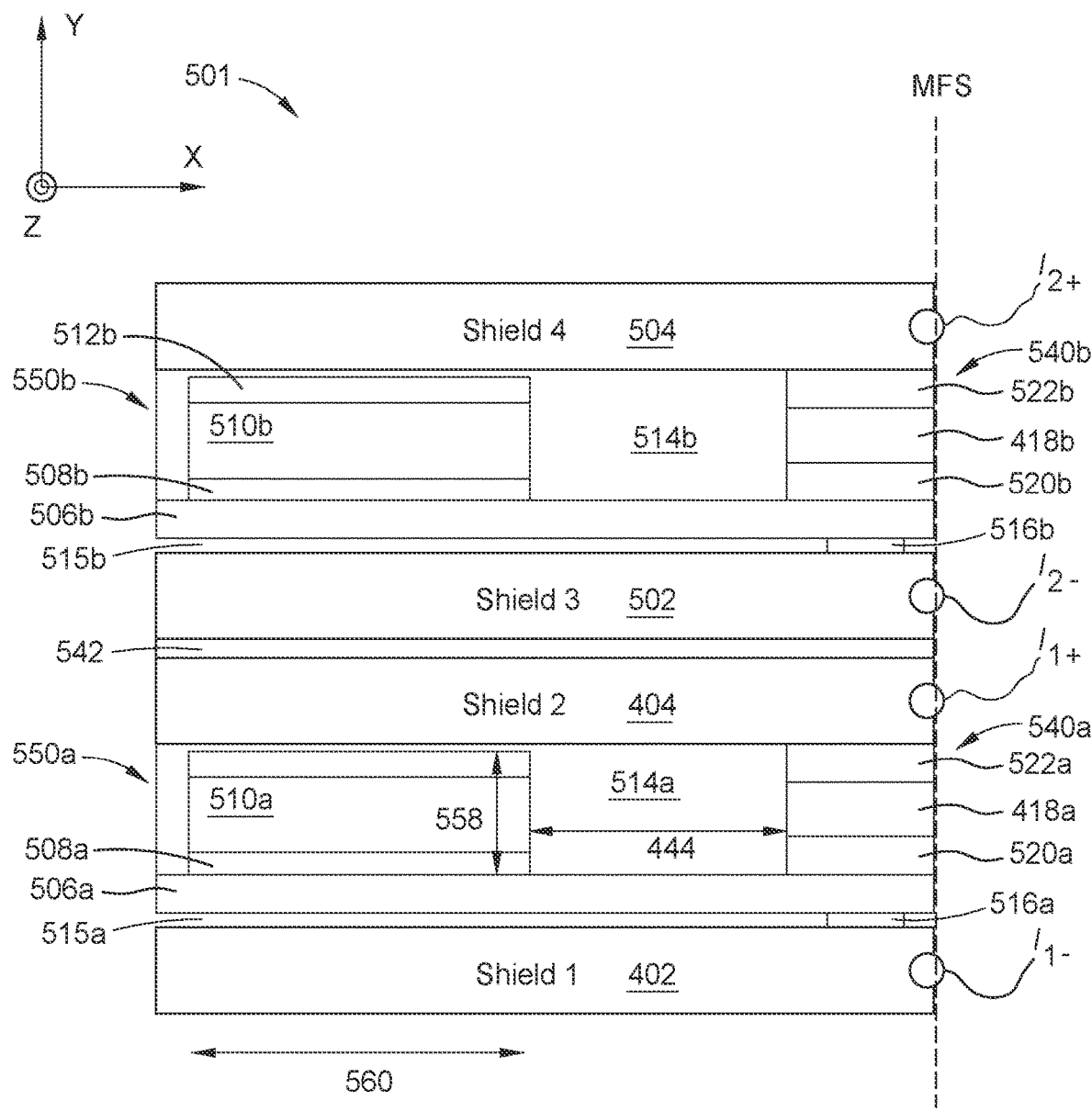
FIGS. 5C-5D illustrate a read head of a magnetic recording head, according to another embodiment.
Figure 5D:
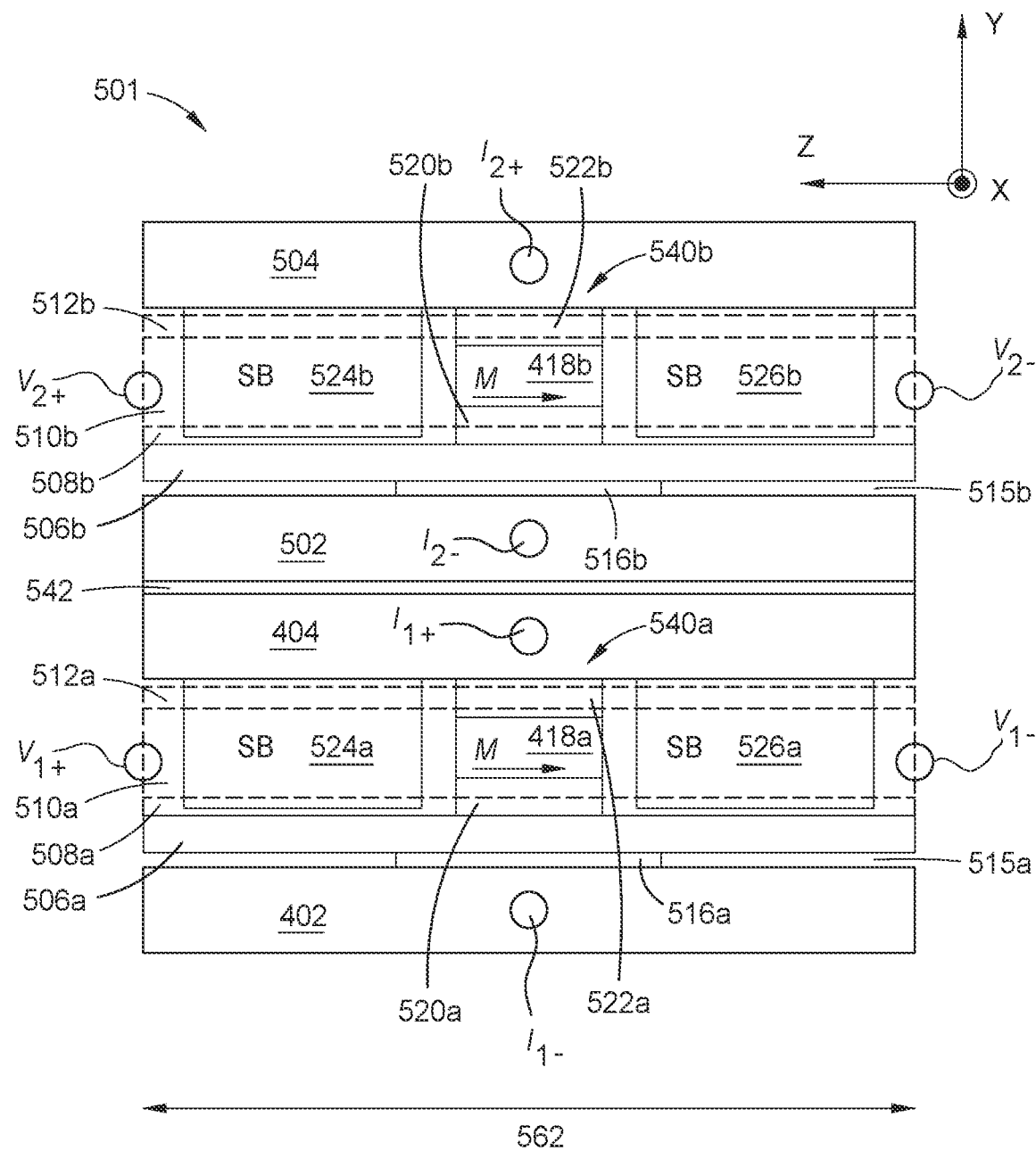

FIGS. 5C-5D illustrate a read head 501 of a magnetic recording head, according to one embodiment. FIG. 5C illustrates a cross-sectional view of the read head 501 and FIG. 5D illustrates a MFS view of the read head 501. In the read head 501, the non-magnetic layer 406 may be rectangular in shape, like shown and discussed above in FIGS. 4A-4D.

The read head 501 is similar to the read head 500 of FIGS. 5A-5B; however, the current and voltage leads are reversed. In the read head 501, a first negative current lead ($I_{1-}$) is connected to the first lower shield 402 and a first positive current lead ($I_{1+}$) is connected to the first upper shield 404 for spin injection, enabling an electrical signal generation across the first sensor 540a when the first free layer 418a rotates magnetization directions when reading data. A second negative current lead ($I_{2-}$) is connected to the second lower shield 502 and a second positive current lead ($I_{2+}$) is connected to the second upper shield 504 for spin injection, enabling an electrical signal generation across the second sensor 540b when the second free layer 418b rotates magnetization directions when reading data. A first positive voltage lead ($V_{1+}$) and a first negative voltage lead ($V_{1-}$) are each connected to the first SOT layer 510a read signal detection of the first FL sensor 540a. A second positive voltage lead ($V_{2+}$) and a second negative voltage lead ($V_{2-}$) are each conned to the second SOT layer 510b for read detection of the second FL sensor 540b.

Figure 6A:
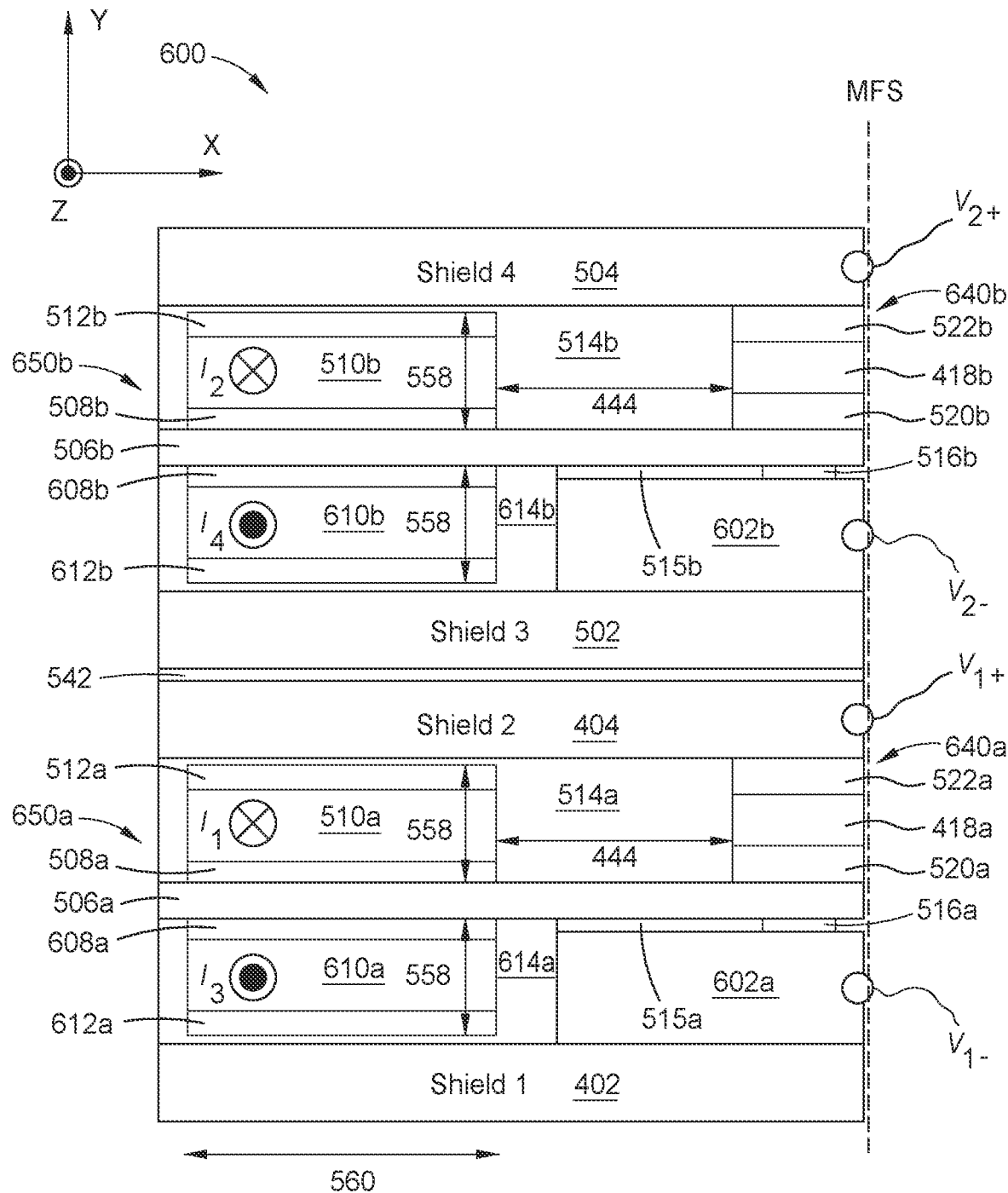
FIGS. 6A-6B illustrate a read head of a magnetic recording head, according to yet another embodiment.
Figure 6B:
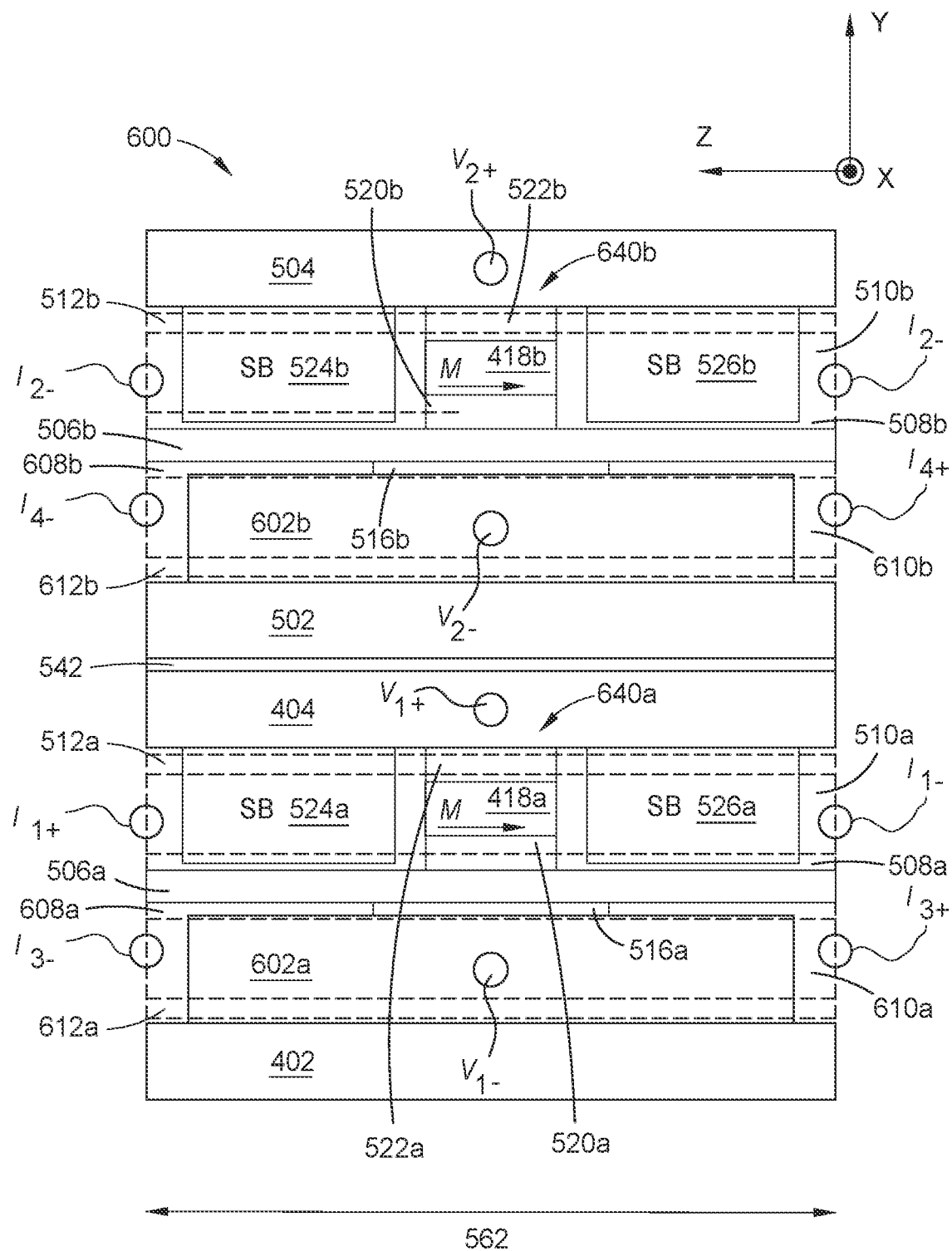

During operation, when the input current is applied to the TDMR read head 501 using the first and second positive current leads and the first and second negative current leads, a first spin current is generated from the first FL sensor 540a and flows through the first non-magnetic layer 506a to the SOT spin generator 550a where the first spin current flows out-of-plane (i.e., in the y-direction), and a second spin current travels is generated the second FL sensor 540b and flows through the second non-magnetic layer 506b to the second SOT spin generator 550b where the second spin current flows out-of-plane (i.e., in the y-direction). The vertical spin current flowing into the SOT layers 510a, 510b enables an electrical signal generation across the SOT layers 510a, 510b via the inverse spin Hall effect when the free layers 418a, 418b each rotates its magnetization directions when reading data. Because the two split spin currents flow opposite in the y-direction, the generated signal polarity will be opposite as well, as shown by the voltage leads $V_{2+}/V_{2-}$ and $V_{1+}/V_{1-}$ in FIG. 5D. The first positive voltage lead ($V_{1+}$) and the second negative voltage lead ($V_{2-}$) are connected together such that the final signal read out occurs at the first negative voltage lead ($V_{1-}$) and the second positive voltage lead ($V_{2+}$). FIGS. 6A-6B illustrate a TDMR read head 600 of a magnetic recording head, according to another embodiment. FIG. 6A illustrates a cross-sectional view of the TDMR read head 600 and FIG. 6B illustrates a MFS view of the TDMR read head 600. The TDMR read head 600 is similar to the TDMR read head 500 of FIGS. 5A-5B; however, the first SOT spin generator 550a and the second SOT spin generator 550b each individually comprise two SOT layers.

In the TDMR read head 600, a first shield notch 602a is disposed between the first lower shield 402 and the first notch 516a of the first non-magnetic layer 506a. The first shield notch 602a is disposed at the MFS, and may comprise the same materials as the first lower shield 402. A third cap layer 612a is disposed over the first lower shield 402, recessed from the MFS. A third SOT layer 610a is disposed on the third cap layer 612a, and a third seed layer 608a is disposed on the third SOT layer 610a. The first non-magnetic layer 506a is disposed over the third seed layer 608a. A third insulating layer 614a is disposed between the first shield notch 602a and the third cap layer 612a, the third SOT layer 610a, and the third seed layer 608a.

The third insulating layer 614a may comprise the same materials as the first insulating layer 514a, the third cap layer 612a may comprise the same materials as the first cap layer 512a, the third SOT layer 610a may comprise the same materials as the first SOT layer 510a, and the third seed layer 608a may comprise the same materials as the first seed layer 508a. The third insulating layer 614a may extend between the third cap layer 612a and the first lower shield 402 to the area behind the third cap layer 612a, the third SOT layer 610a, and the third seed layer 608a. The first shield notch 602a may comprise the same material as the first notch 516a and/or the second notch 516b.

Similarly, a second shield notch 602b is disposed between the second lower shield 502 and the second notch 516b of the second non-magnetic layer 506b. The second shield notch 602b is disposed at the MFS. A fourth cap layer 612b is disposed over the second lower shield 502, recessed from the MFS. A fourth SOT layer 610b is disposed on the fourth cap layer 612b, and a fourth seed layer 608b is disposed on the fourth SOT layer 610b. The second non-magnetic layer 506b is disposed over the fourth seed layer 608b. A fourth insulating layer 614b is disposed between the second shield notch 602b and the fourth cap layer 612b, the fourth SOT layer 610b, and the fourth seed layer 608b.

The fourth insulating layer 614b may comprise the same materials as the second insulating layer 514b, the fourth cap layer 612b may comprise the same materials as the second cap layer 512b, the fourth SOT layer 610b may comprise the same materials as the second SOT layer 510b, and the fourth seed layer 608b may comprise the same materials as the second seed layer 508b. The third SOT layer 610a and the fourth SOT layer 610b may each individually have the same dimensions as the first SOT layer 510a and the second SOT layer 510b. The fourth insulating layer 614b may extend between the fourth cap layer 612b and the second lower shield 502 to the area behind the fourth cap layer 612b, the fourth SOT layer 610b, and the fourth seed layer 608b. The second shield notch 602b may comprise the same material as the first shield notch 602a.

Each SOT layer 510a, 510b, 610a, 610b is spaced the distance 444 from the first free layer 418a and the second free layer 418b, respectively. In some embodiments, the first upper shield 404 and the second lower shield 502 are one middle shield, and the insulating layer 542 is not included, like shown in the TDMR read head 800 of FIGS. 8A-8B.

A first negative voltage lead ($V_{1-}$) is connected to the first shield notch 602a and a first positive voltage lead ($V_{1+}$) is connected to the first upper shield 404 for read signal detection through the first FL sensor 640a. A second negative voltage lead ($V_{2-}$) is connected to the second shield notch 602b and a second positive voltage lead ($V_{2+}$) is connected to the second upper shield 504 for read detection through the second FL sensor 640b.

As shown in the MFS view of FIG. 6B, the TDMR read head 600 further comprises a first soft bias (SB) side shield 524a and a second SB side shield 526a each adjacent to the first FL sensor 640a at the MFS. A third SB side shield 524b and a fourth SB side shield 526b are disposed adjacent to the second FL sensor 640b at the MFS. The first, second, third, and fourth SB side shields 524a, 526a, 524b, 526b may each individually comprise NiFe, CoFe, and other magnetic materials for proper free layer biasing across track. The first shield notch 602a is disposed in front of the third SOT layer 610a at the MFS, and the second shield notch 602b is disposed in front of the fourth SOT layer 610b at the MFS.

A first positive current lead ($I_{1+}$) and a first negative current lead ($I_{1-}$) are each connected to the first SOT layer 510a. A first electrical current ($I_1$) travels through the first SOT layer 510a into the page of FIG. 6A, or the −z-direction. A second positive current lead ($I_{2+}$) and a second negative current lead ($I_{2-}$) are each connected to the second SOT layer 510b. A second electrical current ($I_2$) travels through the second SOT layer 510b into the page of FIG. 6A, or the −z-direction. A third positive current lead ($I_{3+}$) and a third negative current lead ($I_{3-}$) are each connected to the third SOT layer 610a. A third electrical current ($I_3$) travels through the third SOT layer 610a out of the page of FIG. 6A, or in the z-direction. A fourth positive current lead ($I_{4+}$) and a fourth negative current lead ($I_{4-}$) are each connected to the fourth SOT layer 610b. A fourth electrical current ($I_4$) travels through the fourth SOT layer 610b out of the page of FIG. 6A, or in the z-direction.

Thus, from the first lower shield 402 to the second upper shield 504, the third SOT layer 610a has an electrical current traveling in the z-direction, the first SOT layer 510a has electrical current traveling in the −z-direction, the fourth SOT layer 610b has an electrical current traveling in the z-direction, and the second SOT layer 510b has an electrical current traveling in the −z-direction. As such, the first, second, third, and fourth SOT layers 510a, 510b, 610a, 610b have alternating electrical current directions.

Moreover, the first positive current lead ($I_{1+}$) is aligned with, or disposed adjacent to, to the third negative current lead ($I_{3-}$), and the second positive current lead ($I_{2+}$) is aligned with, or disposed adjacent to, to the fourth negative current lead ($I_{4-}$). As such, the first negative current lead ($I_{1-}$) is aligned with, or disposed adjacent to, to the third positive current lead ($I_{3+}$), and the second negative current lead ($I_{2-}$) is aligned with, or disposed adjacent to, to the fourth positive current lead ($I_{4+}$). Thus, the positive and negative current leads are alternating.

During operation, when the electrical currents described above are applied to the TDMR read head 600, a first spin current travels from the first SOT spin generator 650a down through the first non-magnetic layer 506a to the first FL sensor 640a, and a second spin current travels from the second SOT spin generator 650b down through the second non-magnetic layer 506b to the second FL sensor 640b. Having two SOT layers 510b, 610b on opposite sides of the second non-magnetic layer 506b with opposite electrical currents can double the amount of the first spin current generated. Similarly, having two SOT layers 510a, 610a on opposite sides of the first non-magnetic layer 506a with opposite electrical currents can double the amount of the second spin current generated. Those spin injections allow the spin current to flow to the first and second FL sensors 640a, 640b, enabling an electrical signal generation across the first sensor 640a and the second sensor 640b when the first and second free layers 418a, 418b rotate magnetization directions when reading data.

Figure 6C:
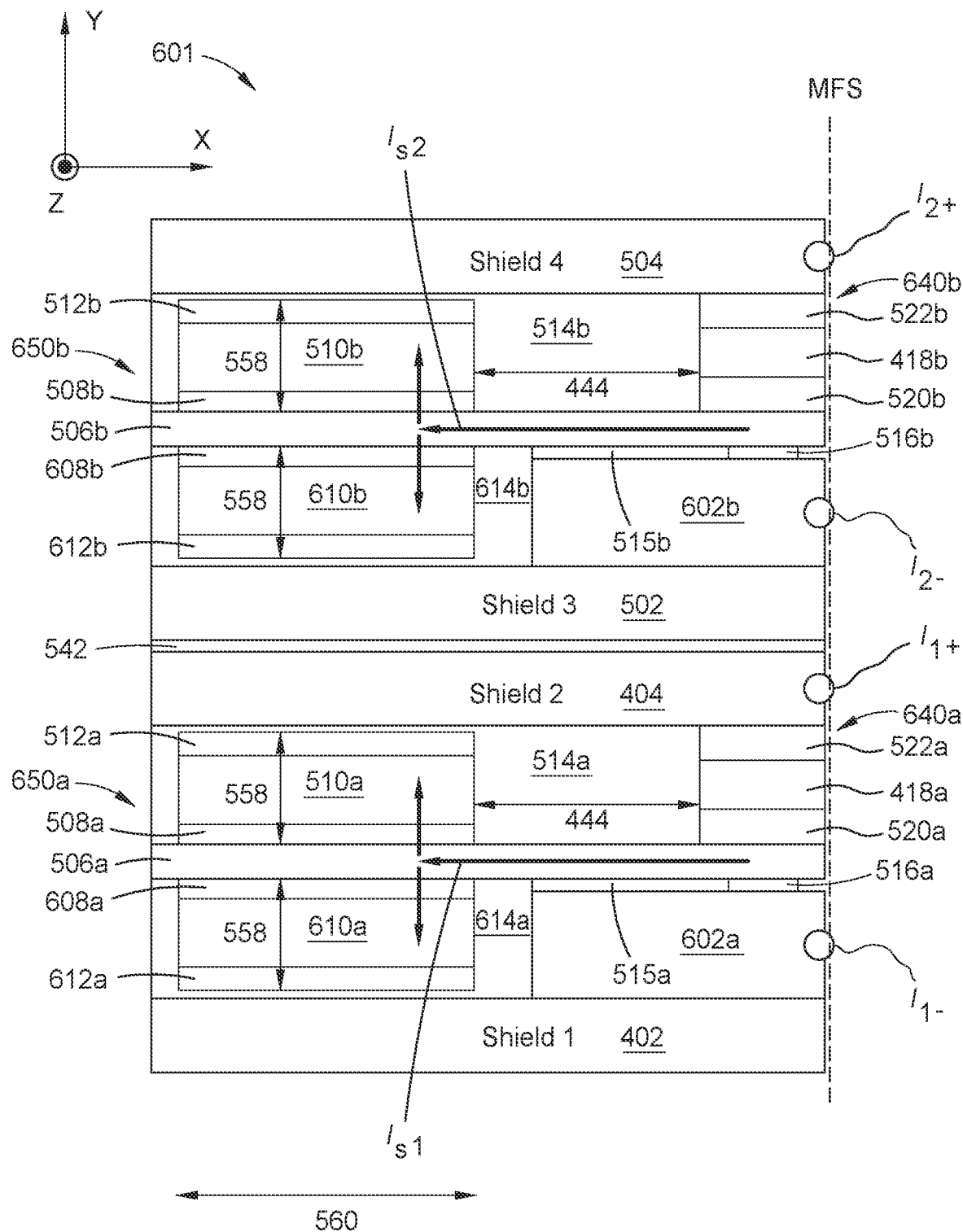
FIGS. 6C-6D illustrate a read head of a magnetic recording head, according to one embodiment.
Figure 6D:
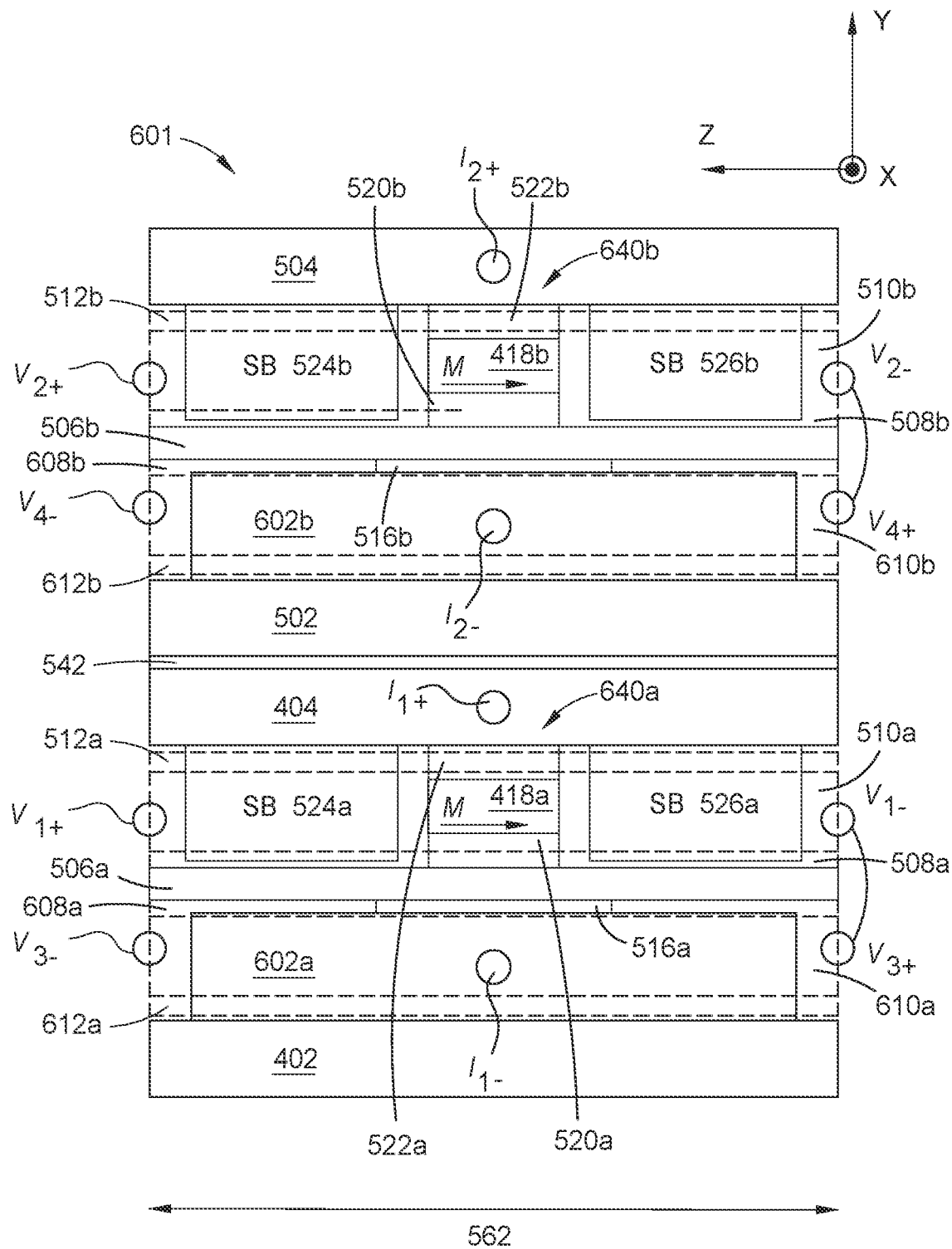

FIGS. 6C-6D illustrate a read head 601 of a magnetic recording head, according to one embodiment. FIG. 6C illustrates a cross-sectional view of the read head 601 and FIG. 6D illustrates a MFS view of the read head 601. In the read head 601, the non-magnetic layer 406 may be rectangular in shape, like shown and discussed above in FIGS. 4A-4D.

The read head 601 is similar to the read head 600 of FIGS. 6A-6B; however, the current and voltage leads are reversed. In the read head 601, a first negative current lead ($I_{1-}$) is connected to the first shield notch 602a and a first positive current lead ($I_{1+}$) is connected to the first upper shield 404 for spin injection, enabling an electrical signal generation across the first sensor 540a when the first free layer 418a rotates magnetization directions when reading data. A second negative current lead ($I_{2-}$) is connected to the second shield notch 602b and a second positive current lead ($I_{2+}$) is connected to the second upper shield 504 for spin injection, enabling an electrical signal generation across the second sensor 540b when the second free layer 418b rotates magnetization directions when reading data.

A first positive voltage lead ($V_{1+}$) and a first negative voltage lead ($V_{1-}$) are each connected to the first SOT layer 510a and a third negative voltage lead ($V_{3-}$), and a third positive voltage lead ($V_{3+}$) are each connected to the third SOT layer 610a, for read signal detection of the first FL sensor 640a. The first negative voltage lead ($V_{1-}$) and the third positive voltage lead ($V_{3+}$) are connected together such that the final signal read out occurs at the first positive voltage lead ($V_{1+}$) and the third negative voltage lead ($V_{3-}$). A second positive voltage lead ($V_{2+}$) and a second negative voltage lead ($V_{2-}$) are each connected to the second SOT layer 510b and a fourth negative voltage lead ($V_{4-}$), and a fourth positive voltage lead ($V_{4+}$) are each connected to the fourth SOT layer 610b, for read signal detection of the second FL sensor 640b. The second negative voltage lead ($V_{2-}$) and the fourth positive voltage lead ($V_{4+}$) are connected together such that the final signal read out occurs at the second positive voltage lead ($V_{2+}$) and the fourth negative voltage lead ($V_{4-}$).

During operation, when the input current is applied to the read head 601 using the first and second positive current leads and the first and second negative current leads, a first spin current ($I_{s1}$) is generated from the first FL sensor 640a and flows through the first non-magnetic layer 506a to the SOT spin generator 550a where the first spin current flows out-of-plane (i.e., in the y-direction), and a second spin current ($I_{s2}$) travels is generated the second FL sensor 540b and flows through the second non-magnetic layer 506b to the second SOT spin generator 550b where the second spin current flows out-of-plane (i.e., in the y-direction). Two inverse spin Hall effect voltages are then induced separately on the first and third SOT layers 510a, 610a, and two inverse spin Hall effect voltages are then induced separately on the second and fourth SOT layers 510b, 610b. The vertical spin currents flowing into the first and third SOT layers 510a, 610a in opposite directions, and into the second and fourth SOT layers 510b, 610b in opposite directions, enable an electrical signal generation across the SOT layers 510a, 510b, 610a, 610b via the inverse spin Hall effect when the free layers 418a, 418b each rotates its magnetization directions when reading data. Because the two split spin currents flow opposite in the y-direction, the generated signal polarity will be opposite as well, as shown by the voltage leads $V_{1+}/V_{1-}$, $V_{2+}/V_{2-}$, $V_{3+}/V_{3-}$, and $V_{4+}/V_{4-}$ in FIG. 6D.

Figure 7A:
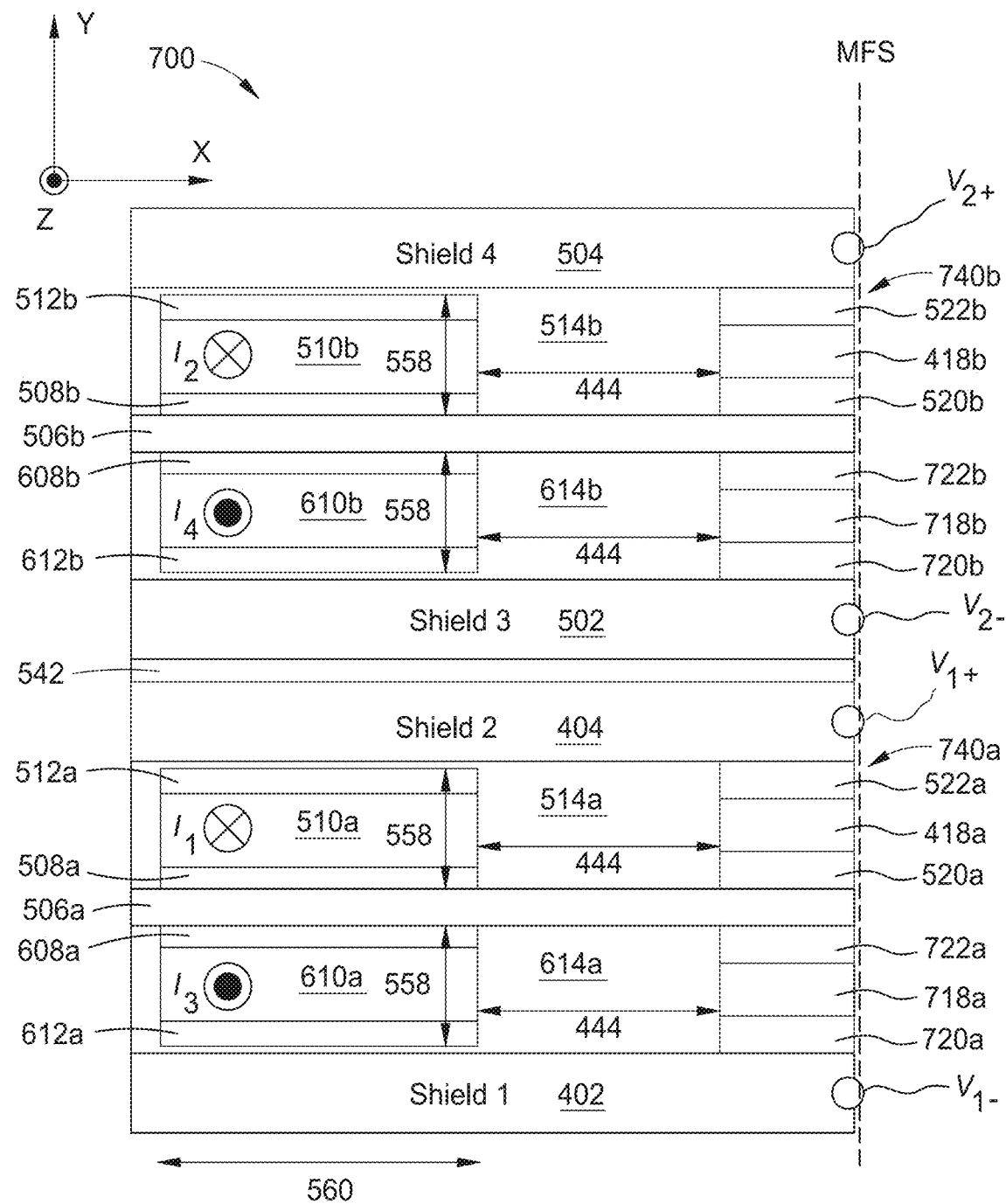
FIGS. 7A-7B illustrate a read head of a magnetic recording head, according to yet another embodiment.
Figure 7B:
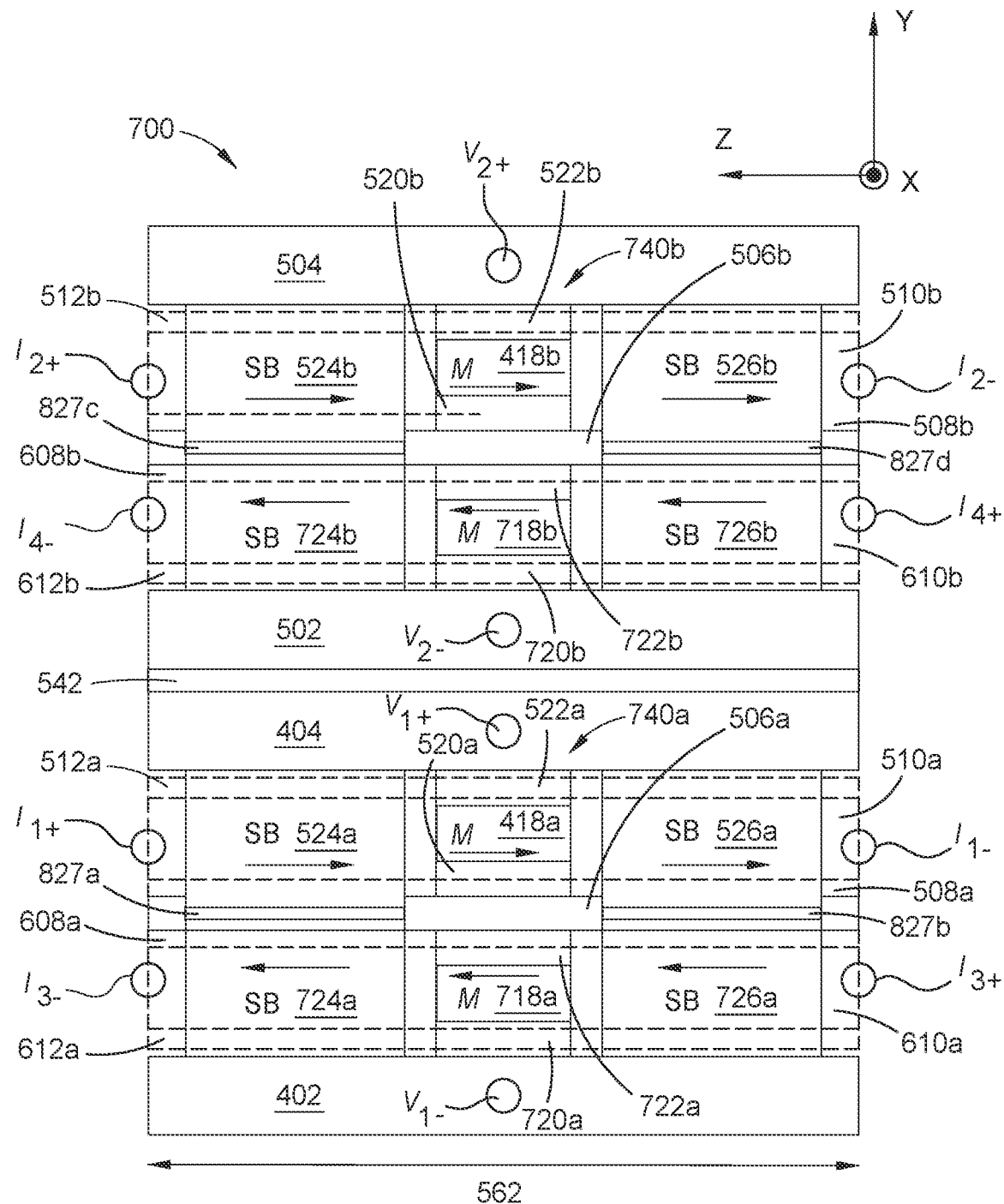

FIGS. 7A-7B illustrate a TDMR read head 700 of a magnetic recording head, according to yet another embodiment. FIG. 7A illustrates a cross-sectional view of the TDMR read head 700 and FIG. 7B illustrates a MFS view of the TDMR read head 700. The TDMR read head 700 is similar to the read head 600 of FIGS. 6A-6B; however, the first and second sensors 740a, 740b are DFL sensors. Further, the read head 700 does not comprise the first shield notch 602a, the second shield notch 602b, the first notch 516a, or the second notch 516b.

In the TDMR read head 700, the first FL sensor 740a and the second FL sensor 740b are each dual free layer (DFL) sensors. A third free layer 718a is disposed between the first lower shield 402 and the first non-magnetic layer 506a, and a fourth free layer 718b is disposed between the second lower shield 502 and the second non-magnetic layer 506b. A third tunnel barrier layer 722a is disposed between the third free layer 718a and the first non-magnetic layer 506a, and a fourth tunnel barrier layer 722b is disposed between the fourth free layer 718b and the second non-magnetic layer 506b. A third cap layer 720a is disposed between the first lower shield 402 and the third free layer 718a, and a fourth cap layer 720b is disposed between the fourth free layer 718b and the second lower shield 502. The third and fourth free layers 718a, 718b may each individually comprise the same materials as the first and/or second free layers 418a, 418b. The third and fourth tunnel barrier layers 722a, 722b may each individually comprise the same materials as the first and second tunnel barrier layers 520a, 520b. The third and fourth cap layers 720a, 720b may each individually comprise the same materials as the first and cap layers 522a, 522b. Each SOT layer 510a, 510b, 610a, 610b is spaced the distance 444 from the first free layer 418a, the second free layer 418b, the third free layer 718a, and the fourth free layer 718b, respectively.

The TDMR read head 700 further comprises a fifth SB side shield 724a and a sixth SB side shield 726a disposed adjacent to the third free layer 718a at the MFS, and a seventh SB side shield 724b and an eighth SB side shield 726b disposed adjacent to the fourth free layer 718b at the MFS. A first Ru layer 827a is disposed between and in contact with the first SB side shield 524a and the fifth SB side shield 724a. A second Ru layer 827b is disposed between and in contact with the second SB side shield 526a and the sixth SB side shield 726a. A third Ru layer 827c is disposed between and in contact with the third SB side shield 524b and the seventh SB side shield 724b. A fourth Ru layer 827d is disposed between and in contact with the fourth SB side shield 526b and the eighth SB side shield 726b. The thickness of the Ru of the Ru layers 827a-827d is adjusted so that magnetization of the SB side shields 724a, 724b, 524a, 524b are anti-parallel to each other along the cross track direction.

The first free layer 418a has a magnetization direction in the −z-direction, the second free layer 418b has a magnetization direction in the −z-direction, the third free layer 718a has a magnetization direction in the z-direction, and the fourth free layer 718b has a magnetization direction in the z-direction. Thus, from the first lower shield 402 to the second upper shield 504, the first, second, third, and fourth free layers 418a, 418b, 718a, 718b have alternating magnetization directions.

A first positive current lead ($I_{1+}$) and a first negative current lead ($I_{1-}$) are each connected to the first SOT layer 510a. A first electrical current ($I_1$) travels through the first SOT layer 510a into the page of FIG. 7A, or the −z-direction. A second positive current lead ($I_{2+}$) and a second negative current lead ($I_{2-}$) are each connected to the second SOT layer 510b. A second electrical current ($I_2$) travels through the second SOT layer 510b into the page of FIG. 7A, or the −z-direction. A third positive current lead ($I_{3+}$) and a third negative current lead ($I_{3-}$) are each connected to the third SOT layer 610a. A third electrical current ($I_3$) travels through the third SOT layer 610a out of the page of FIG. 7A, or in the z-direction. A fourth positive current lead ($I_{4+}$) and a fourth negative current lead ($I_{4-}$) are each connected to the fourth SOT layer 610b. A fourth electrical current ($I_4$) travels through the fourth SOT layer 610b out of the page of FIG. 7A, or in the z-direction.

Thus, from the first lower shield 402 to the second upper shield 504, the third SOT layer 610a has an electrical current traveling in the z-direction, the first SOT layer 510a has an electrical current traveling in the −z-direction, the fourth SOT layer 610b has an electrical current traveling in the z-direction, and the second SOT layer 510b has an electrical current traveling in the −z-direction. As such, the first, second, third, and fourth SOT layers 510a, 510b, 610a, 610b have alternating current directions.

Moreover, the first positive current lead ($I_{1+}$) is aligned with, or disposed adjacent to, to the third negative current lead ($I_{3-}$), and the second positive current lead ($I_{2+}$) is aligned with, or disposed adjacent to, to the fourth negative current lead ($I_{4-}$). As such, the first negative current lead ($I_{1-}$) is aligned with, or disposed adjacent to, to the third positive current lead ($I_{3+}$), and the second negative current lead ($I_{2-}$) is aligned with, or disposed adjacent to, to the fourth positive current lead ($I_{4+}$). Thus, the positive and negative current leads are alternating.

During operation, when the currents described above are applied to the TDMR read head 700, four spin currents flow. A first spin current travels from the first SOT layer 510a down through the first non-magnetic layer 506a to the first free layer 418a; enabling an electrical signal generation when the first free layer 418a rotates magnetization directions when reading data. A second spin current travels from the second SOT layer 510b down through the second non-magnetic layer 506b to the second free layer 418b enabling an electrical signal generation when the second free layer 418b switches magnetization directions when reading data.

A third spin current travels from the third SOT layer 610a down through the first non-magnetic layer 506a to the third free layer 718a, enabling an electrical signal generation when the third free layer 718a switches magnetization directions when reading data. A fourth spin current travels from the fourth SOT layer 610b down through the second non-magnetic layer 506b to the fourth free layer 718b, allowing the fourth spin current to flow to the fourth free layer 718b enabling an electrical signal generation when the fourth free layer 718b switches magnetization directions when reading data. The opposite magnetization direction of the second free layer 418b and the fourth free layer 718b, and of the first free layer 418a and the third free layer 718a enable generated signal adding together within each sensor 740a and 740b.

Figure 8A:
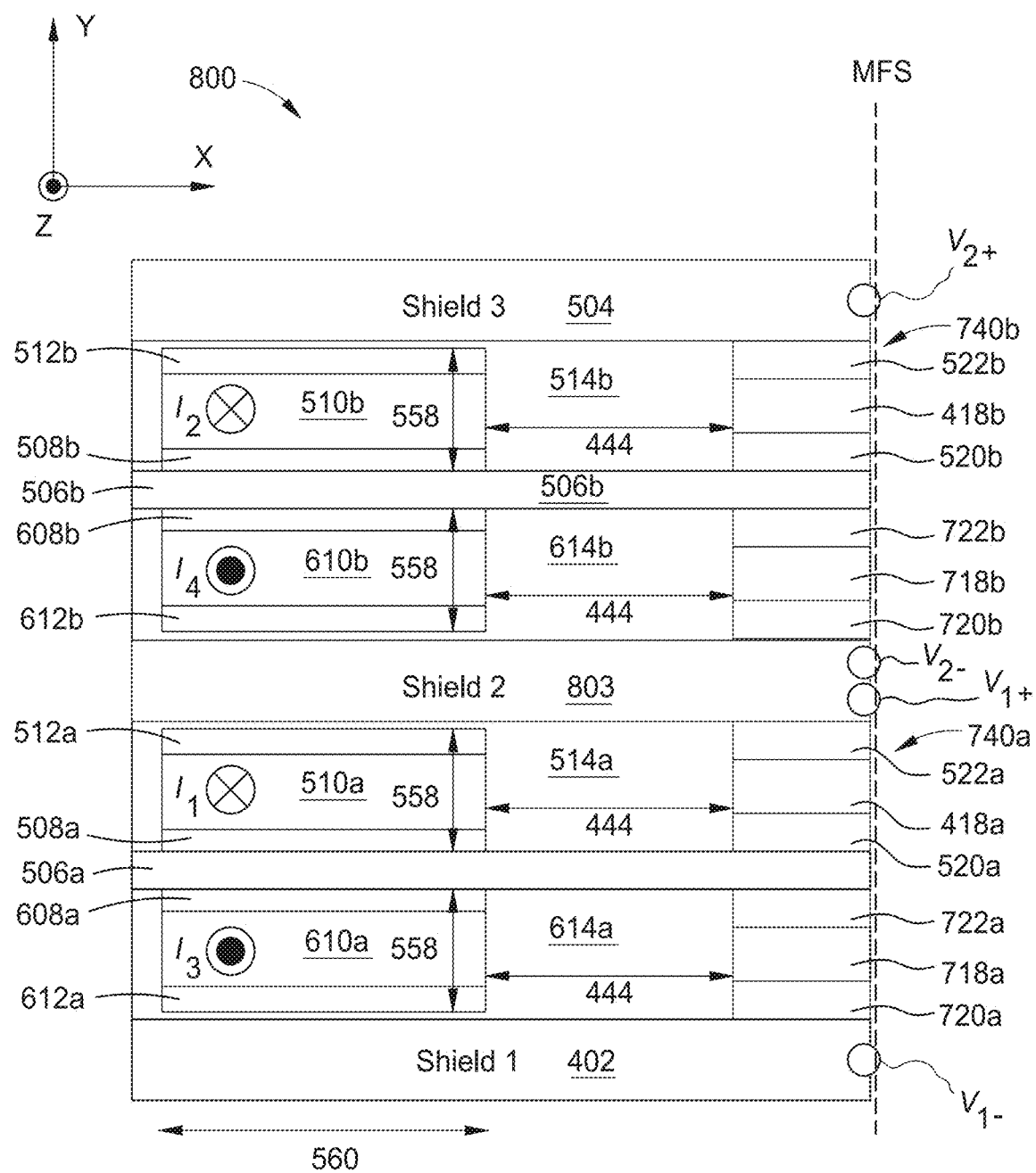
FIGS. 8A-8B illustrate a read head of a magnetic recording head, according to another embodiment.
Figure 8B:
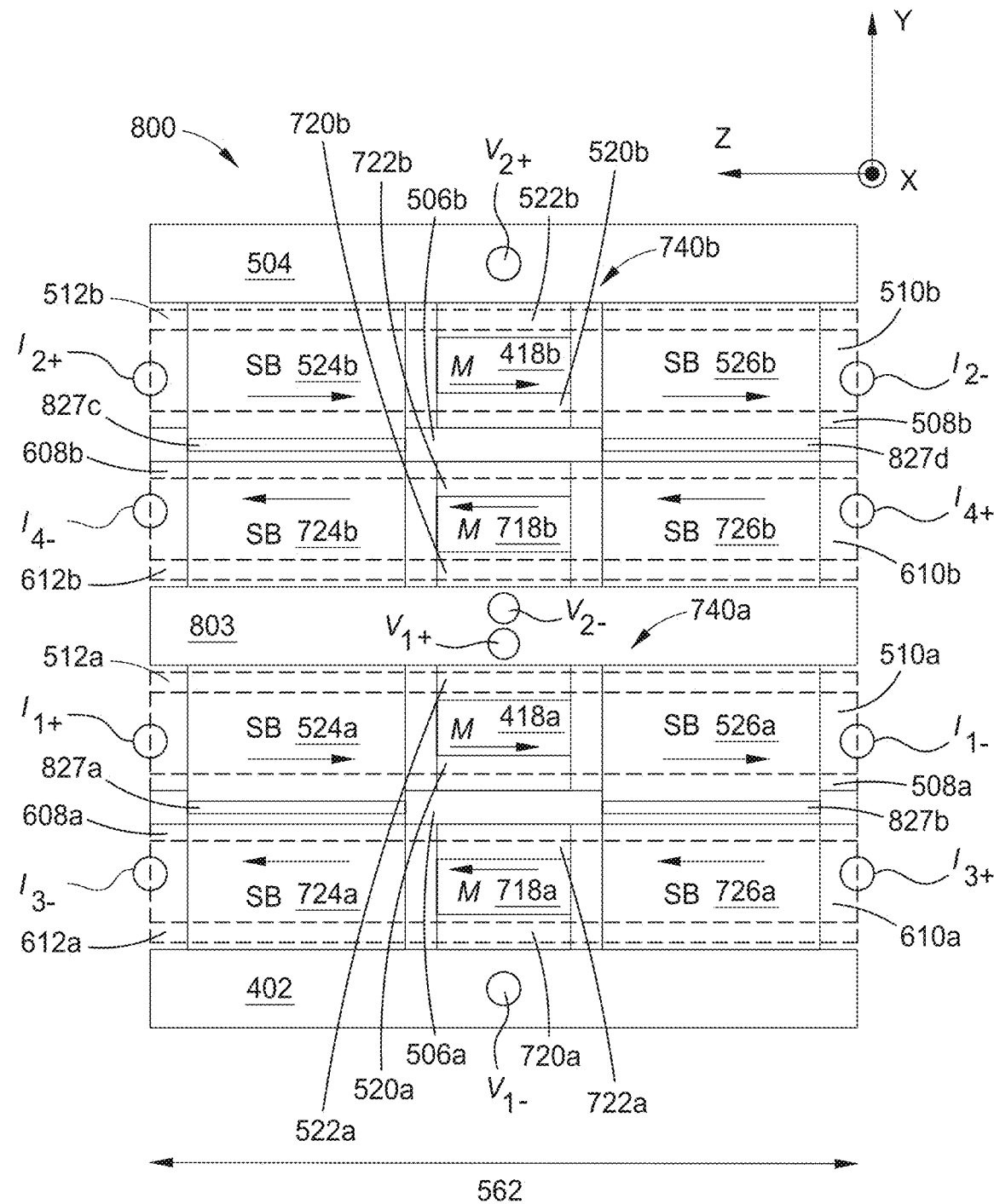

FIGS. 8A-8B illustrate a TDMR read head 800 of a magnetic recording head, according to another embodiment. FIG. 8A illustrates a cross-sectional view of the TDMR read head 800 and FIG. 8B illustrates a MFS view of the TDMR read head 800. The TDMR read head 800 is similar to the TDMR read head 700 of FIGS. 7A-7B; however, the TDMR read head 800 comprises a shared common middle shield 803 rather than the first upper shield 404, the second lower shield 502, and the insulating layer 542.

As such, in the TDMR read head 800, the middle shield 803 is disposed in contact with the first cap layer 522a, the third tunnel barrier layer 720b, the first SB side shield 524a, and the second SB side shield 526a. Like the TDMR read head 700, from the first lower shield 402 to the second upper shield 504, the first, second, third, and fourth free layers 418a, 418b, 718a, 718b have alternating magnetization directions. Each SOT layer 510a, 510b, 610a, 610b is spaced the distance 444 from the first free layer 418a, the second free layer 418b, the third free layer 718a, and the fourth free layer 718b, respectively.

A first negative voltage lead ($V_{1-}$) is connected to the first lower shield 402, and a second positive voltage lead ($V_{2+}$) is connected to the second upper shield 504. A first positive voltage lead ($V_{1+}$) and a second negative voltage lead ($V_{2-}$) are each connected to the same middle shield 803.

A first positive current lead ($I_{1+}$) and a first negative current lead ($I_{1-}$) are each connected to the first SOT layer 510a. A first electrical current ($I_1$) travels through the first SOT layer 510a into the page of FIG. 8A, or the −z-direction. A second positive current lead ($I_{2+}$) and a second negative current lead ($I_{2-}$) are each connected to the second SOT layer 510b. A second electrical current ($I_2$) travels through the second SOT layer 510b into the page of FIG. 8A, or the −z-direction. A third positive current lead ($I_{3+}$) and a third negative current lead ($I_{3-}$) are each connected to the third SOT layer 610a. A third electrical c current ($I_3$) travels through the third SOT layer 610a out of the page of FIG. 8A, or in the z-direction. A fourth positive current lead ($I_{4+}$) and a fourth negative current lead ($I_{4-}$) are each connected to the fourth SOT layer 610b. A fourth electrical current ($I_4$) travels through the fourth SOT layer 610b out of the page of FIG. 8A, or in the z-direction.

Thus, from the first lower shield 402 to the second upper shield 504, the third SOT layer 610a has an electrical current traveling in the z-direction, the first SOT layer 510a has electrical current traveling in the −z-direction, the fourth SOT layer 610b has an electrical current traveling in the z-direction, and the second SOT layer 510b has an electrical current traveling in the −z-direction. As such, the first, second, third, and fourth SOT layers 510a, 510b, 610a, 610b have alternating electrical current directions.

Moreover, the first positive current lead ($I_{1+}$) is aligned with, or disposed adjacent to, to the third negative current lead ($I_{3-}$), and the second positive current lead ($I_{2+}$) is aligned with, or disposed adjacent to, to the fourth negative current lead ($I_{4-}$). As such, the first negative current lead ($I_{1-}$) is aligned with, or disposed adjacent to, to the third positive current lead ($I_{3+}$), and the second negative current lead ($I_{2-}$) is aligned with, or disposed adjacent to, to the fourth positive current lead ($I_{4+}$). Thus, the positive and negative current leads are alternating.

During operation, when currents as described above are applied to the TDMR read head 800, four spin currents flow in the same manner as described above with respect to the TDMR read head 700 of FIGS. 7A-7B.

By including at least one SOT layer in a read sensor recessed from the MFS, the read heads discussed above are able to achieve a higher spin current injection/polarization, such that by making effective polarization significantly larger than 1. Furthermore, due to the trapezoidal shape of the non-magnetic transport layer, the spin current is more concentrated and the signal output is increased at the read sensor disposed at the MFS.

In one embodiment, a read head comprises a first shield; a second shield, a first non-magnetic layer disposed between the first shield and the second shield, a first sensor disposed between the first non-magnetic layer and the second shield at a media facing surface (MFS), the first sensor comprising a first free layer, a first spin generator recessed from the MFS, the first spin generator being spaced from the first sensor, wherein the first spin generator comprises a first spin orbit torque (SOT) layer, a third shield disposed over the second shield, a second non-magnetic layer disposed between the second shield and the third shield, a second sensor disposed between the second non-magnetic layer and the third shield at the MFS, the second sensor comprising a second free layer, and a second spin generator recessed from the MFS, the second spin generator being spaced from the second sensor, wherein the second spin generator comprises a second SOT layer.

The read head further comprises a first non-magnetic notch disposed between the first non-magnetic layer and the first shield, and a second non-magnetic notch disposed between the second non-magnetic layer and the second shield. The read head further comprises a fourth shield disposed between the second shield and the second non-magnetic layer, and an insulating layer disposed between the second shield and the fourth shield. The read head further comprises a first negative voltage lead connected to the first shield, a first positive voltage lead connected to the second shield, a second negative voltage lead connected to the fourth shield, and a second positive voltage lead connected to the third shield. The read head further comprises a first positive current lead connected to the first SOT layer, a first negative current lead connected to the first SOT layer, a second positive current lead connected to the second SOT layer, and a second negative current lead connected to the second SOT layer. The read head further comprises a first negative current lead connected to the first shield, a first positive current lead connected to the second shield, a second negative current lead connected to the fourth shield, and a second positive current lead connected to the third shield. The read head further comprises a first negative current lead connected to the first non-magnetic notch, a first positive current lead connected to the second shield, a second negative current lead connected to the second non-magnetic notch, and a second positive current lead connected to the third shield.

The read head further comprises a first soft bias side shield disposed adjacent to the first sensor at the MFS, a second soft bias side shield disposed adjacent to the first sensor at the MFS, wherein the first sensor is disposed between the first soft bias side shield and the second soft bias side shield, a third soft bias side shield disposed adjacent to the second sensor at the MFS, and a fourth soft bias side shield disposed adjacent to the second sensor at the MFS, wherein the second sensor is disposed between the third soft bias side shield and the fourth soft bias side shield. The first spin generator is disposed between the first non-magnetic layer and the second shield, and wherein the second spin generator disposed is between the second non-magnetic layer and the third shield. A magnetic recording head comprises the read head. A magnetic recording device comprises the magnetic recording head.

In another embodiment, a magnetic recording head comprises a read head, the read head comprising: a first shield, the first shield comprising a first shield notch, a second shield disposed over the first shield, a first non-magnetic layer disposed between the first shield notch and the second shield, a first sensor disposed between the first non-magnetic layer and the second shield at a media facing surface (MFS), the first sensor comprising a first free layer, a first spin generator disposed between the first shield and the second shield recessed from the MFS, the first spin generator being spaced from the first sensor, wherein the first spin generator comprises: a first spin orbit torque (SOT) layer disposed between the first shield and the first non-magnetic layer, and a second SOT layer disposed between the first non-magnetic layer and the second shield, a third shield disposed over the second shield, the third shield comprising a second shield notch, a fourth shield disposed over the third shield, a second non-magnetic layer disposed between the second shield notch and the fourth shield, a second sensor disposed between the second non-magnetic layer and the fourth shield at the MFS, the second sensor comprising a second free layer, and a second spin generator disposed between the third shield and the fourth shield recessed from the MFS, the second spin generator being spaced from the second sensor, wherein the second spin generator comprises: a third SOT layer disposed between the third shield and the second non-magnetic layer, and a fourth SOT layer disposed between the second non-magnetic layer and the fourth shield.

The first SOT layer is disposed adjacent to the first shield notch, the second SOT layer is disposed adjacent to the first free layer, the third SOT layer is disposed adjacent to the second shield notch, and the fourth SOT layer is disposed adjacent to the second free layer. The read head further comprises a first negative voltage lead connected to the first shield, a first positive voltage lead connected to the second shield, a second negative voltage lead connected to the third shield, and a second positive voltage lead connected to the fourth shield. The read head further comprises a first negative current lead connected to the first SOT layer, a first positive current lead connected to the first SOT layer, a second positive current lead connected to the second SOT layer, a second negative current lead connected to the second SOT layer, a third negative current lead connected to the third SOT layer, a third positive current lead connected to the third SOT layer, a fourth positive current lead connected to the fourth SOT layer, and a fourth negative current lead connected to the fourth SOT layer.

The read head further comprises a first non-magnetic notch disposed between the first shield notch and the first non-magnetic layer, a second non-magnetic notch disposed between the second shield notch and the third shield, a first soft bias (SB) side shield disposed adjacent to the first free layer, a second SB side shield disposed adjacent to the first free layer, a third SB side shield disposed adjacent to the second free layer, and a fourth SB side shield disposed adjacent to the second free layer. The read head further comprises a first negative current lead connected to the first shield, a first positive current lead connected to the second shield, a second negative current lead connected to the fourth shield, and a second positive current lead connected to the third shield. The read head further comprises a first negative current lead connected to the first non-magnetic notch, a first positive current lead connected to the second shield, a second negative current lead connected to the second non-magnetic notch, and a second positive current lead connected to the third shield. A magnetic recording device comprises the magnetic recording head.

In yet another embodiment, a magnetic recording head comprises a read head, the read head comprising: a first shield, a second shield, a first non-magnetic layer disposed between the first shield and the second shield, a first sensor disposed between the first shield and the second shield at a media facing surface (MFS), the first sensor comprising a first free layer and a second free layer, a first spin generator disposed between the first shield and the second shield recessed from the MFS, the first spin generator being spaced from the sensor, wherein the first spin generator comprises: a first spin orbit torque (SOT) layer disposed between the first shield and the first non-magnetic layer, and a second SOT layer disposed between the first non-magnetic layer and the second shield, a third shield disposed over the second shield, a second non-magnetic layer disposed between the second shield and the third shield, a second sensor disposed between the second shield and the third shield at the MFS, the second sensor comprising a third free layer and a fourth free layer, and a second spin generator disposed between the second shield and the third shield recessed from the MFS, the second spin generator being spaced from the second sensor, wherein the second spin generator comprises: a third SOT layer disposed between the second shield and the second non-magnetic layer, and a fourth SOT layer disposed between the second non-magnetic layer and the third shield.

The read head further comprises a fourth shield disposed between the second shield and the second non-magnetic layer, and an insulating layer disposed between the second shield and the fourth shield. The read head further comprises a first negative voltage lead connected to the first shield, a first positive voltage lead connected to the second shield, a second negative voltage lead connected to the third shield, and a second positive voltage lead connected to the fourth shield. The read head further comprises a first negative current lead connected to the first SOT layer, a first positive current lead connected to the first SOT layer, a second positive current lead connected to the second SOT layer, a second negative current lead connected to the second SOT layer, a third negative current lead connected to the third SOT layer, a third positive current lead connected to the third SOT layer, a fourth positive current lead connected to the fourth SOT layer, and a fourth negative current lead connected to the fourth SOT layer.

The read head further comprises a first negative voltage lead connected to the first shield, a first positive voltage lead connected to the second shield, a second negative voltage lead connected to the second shield, and a second positive voltage lead connected to the third shield. The read head further comprises a first negative current lead connected to the first shield, a first positive current lead connected to the second shield, a second negative current lead connected to the fourth shield, and a second positive current lead connected to the third shield. The first free layer is disposed between the first shield and the first non-magnetic layer, the second free layer is disposed between the first non-magnetic layer and the second shield, the third free layer is disposed between the second shield and the second non-magnetic layer, and the fourth free layer is disposed between the second non-magnetic layer and the third shield. The read head further comprises a first soft bias side shield disposed adjacent to the first free layer at the MFS, a second soft bias side shield disposed adjacent to the first free layer at the MFS, a third soft bias side shield disposed adjacent to the second free layer at the MFS, a fourth soft bias side shield disposed adjacent to the second free layer at the MFS, a fifth soft bias side shield disposed adjacent to the third free layer at the MFS, a sixth soft bias side shield disposed adjacent to the third free layer at the MFS, a seventh soft bias side shield disposed adjacent to the fourth free layer at the MFS, and an eighth soft bias side shield disposed adjacent to the fourth free layer at the MFS.

During operation, the first free layer and the second free layer have anti-parallel magnetizations, the third free layer and the fourth free layer have anti-parallel magnetizations, and the first free layer and the third free layer have parallel magnetizations. The read head further comprises a fourth shield disposed between the second shield and the second non-magnetic layer, a first non-magnetic notch disposed between the first non-magnetic layer and the first shield, a second non-magnetic notch disposed between the second non-magnetic layer and the second shield, a first negative current lead connected to the first non-magnetic notch, a first positive current lead connected to the second shield, a second negative current lead connected to the second non-magnetic notch, and a second positive current lead connected to the third shield. A magnetic recording device comprises the magnetic recording head.

While the foregoing is directed to embodiments of the present disclosure, other and further embodiments of the disclosure may be devised without departing from the basic scope thereof, and the scope thereof is determined by the claims that follow.

What is claimed is:
1. A read head, comprising:
a first shield;
a second shield;
a first non-magnetic layer disposed between the first shield and the second shield;
a first sensor disposed between the first non-magnetic layer and the second shield at a media facing surface (MFS), the first sensor comprising a first free layer;
a first spin generator recessed from the MFS, the first spin generator being spaced from the first sensor wherein the first spin generator comprises a first seed layer, a
first non-magnetic spin orbit torque (SOT) layer, and a
first cap layer;
a third shield disposed over the second shield;
a second non-magnetic layer disposed between the second
shield and the third shield;
a second sensor disposed between the second non-magnetic layer and the third shield at the MFS, the second
sensor comprising a second free layer; and
a second spin generator recessed from the MFS, the
second spin generator being spaced from the second
sensor, wherein the second spin generator comprises a
second seed layer, a second non-magnetic SOT layer,
and a second cap layer.

2. The read head of claim 1, further comprising:
a first magnetic notch disposed between the first non-magnetic layer and the first shield; and
a second magnetic notch disposed between the second
non-magnetic layer and the second shield.

3. The read head of claim 1, further comprising:
a fourth shield disposed between the second shield and the
second non-magnetic layer; and
an insulating layer disposed between the second shield
and the fourth shield.

4. The read head of claim 3, further comprising:
a first negative voltage lead connected to the first shield;
a first positive voltage lead connected to the second
shield;
a second negative voltage lead connected to the fourth
shield; and
a second positive voltage lead connected to the third
shield.

5. The read head of claim 3, further comprising:
a first positive current lead connected to the first non-magnetic SOT layer;
a first negative current lead connected to the first non-magnetic SOT layer;
a second positive current lead connected to the second
non-magnetic SOT layer; and
a second negative current lead connected to the second
non-magnetic SOT layer.

6. The read head of claim 1, further comprising:
a first soft bias side shield disposed adjacent to the first
sensor at the MFS;
a second soft bias side shield disposed adjacent to the first
sensor at the MFS, wherein the first sensor is disposed
between the first soft bias side shield and the second
soft bias side shield;
a third soft bias side shield disposed adjacent to the
second sensor at the MFS; and
a fourth soft bias side shield disposed adjacent to the
second sensor at the MFS, wherein the second sensor is
disposed between the third soft bias side shield and the
fourth soft bias side shield.

7. The read head of claim 1, wherein the first spin
generator is disposed between the first non-magnetic layer
and the second shield, and wherein the second spin generator
disposed is between the second non-magnetic layer and the
third shield.

8. A magnetic recording head comprising the read head of
claim 1.

9. A magnetic recording device comprising the magnetic
recording head of claim 8.

10. A magnetic recording head, comprising:
a read head, the read head comprising:
a first shield, the first shield comprising a first shield
notch;
a second shield disposed over the first shield;
a first non-magnetic layer disposed between the first
shield notch and the second shield;
a first sensor disposed between the first non-magnetic
layer and the second shield at a media facing surface
(MFS), the first sensor comprising a first free layer;
a first spin generator disposed between the first shield
and the second shield recessed from the MFS, the
first spin generator being spaced from the first sensor, wherein the first spin generator comprises:
a first seed layer;
a first non-magnetic spin orbit torque (SOT) layer
disposed between the first shield and the first
non-magnetic layer;
a second non-magnetic SOT layer disposed between
the first non-magnetic layer and the second shield;
and
a first cap layer;
a third shield disposed over the second shield, the third
shield comprising a second shield notch;
a fourth shield disposed over the third shield;
a second non-magnetic layer disposed between the
second shield notch and the fourth shield;
a second sensor disposed between the second non-magnetic layer and the fourth shield at the MFS, the
second sensor comprising a second free layer; and
a second spin generator disposed between the third
shield and the fourth shield recessed from the MFS,
the second spin generator being spaced from the
second sensor, wherein the second spin generator
comprises:
a second seed layer;
a third non-magnetic SOT layer disposed between
the third shield and the second non-magnetic
layer;
a fourth non-magnetic SOT layer disposed between
the second non-magnetic layer and the fourth
shield; and
a second cap layer.

11. The magnetic recording head of claim 10, wherein the
read head further comprises:
a first magnetic notch disposed between the first shield
notch and the first non-magnetic layer;
a second magnetic notch disposed between the second
shield notch and the third shield;
a first soft bias (SB) side shield disposed adjacent to the
first free layer;
a second SB side shield disposed adjacent to the first free
layer;
a third SB side shield disposed adjacent to the second free
layer; and
a fourth SB side shield disposed adjacent to the second
free layer.

12. The magnetic recording head of claim 11, wherein the
read head further comprises:
a first negative current lead connected to the first magnetic
notch;
a first positive current lead connected to the second shield;
a second negative current lead connected to the second
magnetic notch; and
a second positive current lead connected to the fourth
shield.

13. The magnetic recording head of claim 10, wherein:
the first non-magnetic SOT layer is disposed adjacent to
the first shield notch;
the second non-magnetic SOT layer is disposed adjacent
to the first free layer;

the third non-magnetic SOT layer is disposed adjacent to the second shield notch; and the fourth non-magnetic SOT layer is disposed adjacent to the second free layer.

14. The magnetic recording head of claim 10, wherein the read head further comprises:
a first negative voltage lead connected to the first shield;
a first positive voltage lead connected to the second shield;
a second negative voltage lead connected to the third shield; and
a second positive voltage lead connected to the fourth shield.

15. The magnetic recording head of claim 10, wherein the read head further comprises:
a first negative current lead connected to the first non-magnetic SOT layer;
a first positive current lead connected to the first non-magnetic SOT layer;
a second positive current lead connected to the second non-magnetic SOT layer;
a second negative current lead connected to the second non-magnetic SOT layer;
a third negative current lead connected to the third non-magnetic SOT layer;
a third positive current lead connected to the third non-magnetic SOT layer;
a fourth positive current lead connected to the fourth non-magnetic SOT layer; and
a fourth negative current lead connected to the fourth non-magnetic SOT layer.

16. The magnetic recording head of claim 10, wherein the read head further comprises:
a first negative current lead connected to the first shield;
a first positive current lead connected to the second shield;
a second negative current lead connected to the third shield; and
a second positive current lead connected to the fourth shield.

17. A magnetic recording device comprising the magnetic recording head of claim 10.

18. A read head, comprising:
a first shield;
a second shield;
a first non-magnetic layer disposed between the first shield and the second shield;
a first sensor disposed between the first non-magnetic layer and the second shield at a media facing surface (MFS), the first sensor comprising a first free layer;
a first spin generator recessed from the MFS, the first spin generator being spaced from the first sensor, wherein the first spin generator comprises a first spin orbit torque (SOT) layer;
a third shield disposed over the second shield;
a second non-magnetic layer disposed between the second shield and the third shield;
a second sensor disposed between the second non-magnetic layer and the third shield at the MFS, the second sensor comprising a second free layer;
a second spin generator recessed from the MFS, the second spin generator being spaced from the second sensor, wherein the second spin generator comprises a second SOT layer;
a fourth shield disposed between the second shield and the second non-magnetic layer;
an insulating layer disposed between the second shield and the fourth shield;
a first negative current lead connected to the first shield;
a first positive current lead connected to the second shield;
a second negative current lead connected to the fourth shield; and
a second positive current lead connected to the third shield.

19. A read head, comprising:
a first shield;
a second shield;
a first non-magnetic layer disposed between the first shield and the second shield;
a first sensor disposed between the first non-magnetic layer and the second shield at a media facing surface (MFS), the first sensor comprising a first free layer;
a first spin generator recessed from the MFS, the first spin generator being spaced from the first sensor, wherein the first spin generator comprises a first spin orbit torque (SOT) layer;
a third shield disposed over the second shield;
a second non-magnetic layer disposed between the second shield and the third shield;
a second sensor disposed between the second non-magnetic layer and the third shield at the MFS, the second sensor comprising a second free layer;
a second spin generator recessed from the MFS, the second spin generator being spaced from the second sensor, wherein the second spin generator comprises a second SOT layer;
a fourth shield disposed between the second shield and the second non-magnetic layer;
a first negative current lead connected to a first magnetic notch;
a first positive current lead connected to the second shield;
a second negative current lead connected to a second magnetic notch; and
a second positive current lead connected to the third shield.

* * * * *